US008085345B2

(12) United States Patent
Yamauchi et al.

(10) Patent No.: US 8,085,345 B2
(45) Date of Patent: Dec. 27, 2011

(54) IMAGE PROCESSING APPARATUS AND IMAGE PROCESSING METHOD

(75) Inventors: Yasuhiro Yamauchi, Kawasaki (JP); Takahiro Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 749 days.

(21) Appl. No.: 12/230,117

(22) Filed: Aug. 22, 2008

(65) Prior Publication Data

US 2009/0059066 A1  Mar. 5, 2009

Related U.S. Application Data

(63) Continuation of application No. PCT/JP2006/303321, filed on Feb. 23, 2006.

(51) Int. Cl.
*H04N 7/01* (2006.01)
(52) U.S. Cl. ........................................................ 348/448
(58) Field of Classification Search .................. 348/446, 348/448, 445, 447, 911, 910, 441, 558, 625, 348/607, 611, 614
See application file for complete search history.

(56) References Cited

U.S. PATENT DOCUMENTS

| | | | | |
|---|---|---|---|---|
| 4,646,133 A * | 2/1987 | Blanchard et al. | ............ | 348/450 |
| 5,353,405 A | 10/1994 | Doi et al. | | |
| 5,907,364 A * | 5/1999 | Furuhata et al. | ............... | 348/459 |
| 6,111,610 A * | 8/2000 | Faroudja | ...................... | 348/441 |
| 6,522,339 B1 * | 2/2003 | Orimo | ........................... | 345/606 |
| 6,567,925 B1 | 5/2003 | Kimura | | |
| 6,580,461 B2 * | 6/2003 | Chambers et al. | ............. | 348/458 |
| 6,927,800 B2 * | 8/2005 | Someya | .......................... | 348/448 |
| 6,987,539 B2 * | 1/2006 | Kondo et al. | .................. | 348/441 |
| 7,119,846 B2 * | 10/2006 | Someya | .......................... | 348/441 |
| 7,271,842 B2 * | 9/2007 | Someya | .......................... | 348/458 |
| 7,349,029 B1 * | 3/2008 | Chou | ............................. | 348/448 |
| 7,573,529 B1 * | 8/2009 | Perlman | ......................... | 348/448 |
| 2002/0180883 A1 | 12/2002 | Tomizawa et al. | | |

FOREIGN PATENT DOCUMENTS

| | | |
|---|---|---|
| JP | 61-251288 | 11/1986 |
| JP | 62-217287 | 9/1987 |
| JP | 4-349547 | 12/1992 |
| JP | 6-261299 | 9/1994 |
| JP | 11-220702 | 8/1999 |
| JP | 2000-350168 | 12/2000 |
| JP | 2002-314949 | 10/2002 |
| JP | 2003-18500 | 1/2003 |
| JP | 2003-189261 | 7/2003 |
| JP | 2006-42039 | 2/2006 |

OTHER PUBLICATIONS

International Search Report for PCT/JP2006/303321, mailed May 30, 2006.

(Continued)

*Primary Examiner* — Paulos Natnael
(74) *Attorney, Agent, or Firm* — Staas & Halsey LLP

(57) ABSTRACT

A double rate processing part generates, at a double rate, a non-interlaced image signal every frame to twice generate a double-rate non-interlaced signal which has identical information duplicately. An interlace part, after a predetermined process is carried out on the double-rate non-interlaced signal twice generated by the double rate processing part, extracts an odd scan lines from one of the twice generated double-rate non-interlaced signal to generate an odd scan line image signal, extracts an even scan lines from the other of the twice generated double-rate non-interlaced signal to generate an even scan line image signal, so as to obtain an interlaced image signal for one frame.

7 Claims, 31 Drawing Sheets

OTHER PUBLICATIONS

Office Action (Notice of Reasons for Rejection), mailed Sep. 13, 2011 and issued in corresponding Japanese Patent Application No. 2008-501531.

English Abstract of Japanese Publication No. 2003-189261, Published Jul. 4, 2003.

* cited by examiner

FIG.1A RELATED ART

| | | | | | | | | |
|---|---|---|---|---|---|---|---|---|
| ■ 1 | | | | | | | | ODD(1) |
| ■ ■ 2 | | | | | | | | EVEN(1) |
| ■ ■ ■ 3 | | | | | | | | ODD(2) |
| ■ ■ ■ ■ 4 | | | | | | | | EVEN(2) |
| ⋮ | | | | | | | | |
| ■ ■ ■ ■ ■ ■ ■ ■ 479 | | | | | | | | ODD(240) |
| ■ ■ ■ ■ ■ ■ ■ ■ ■ 480 | | | | | | | | EVEN(240) |

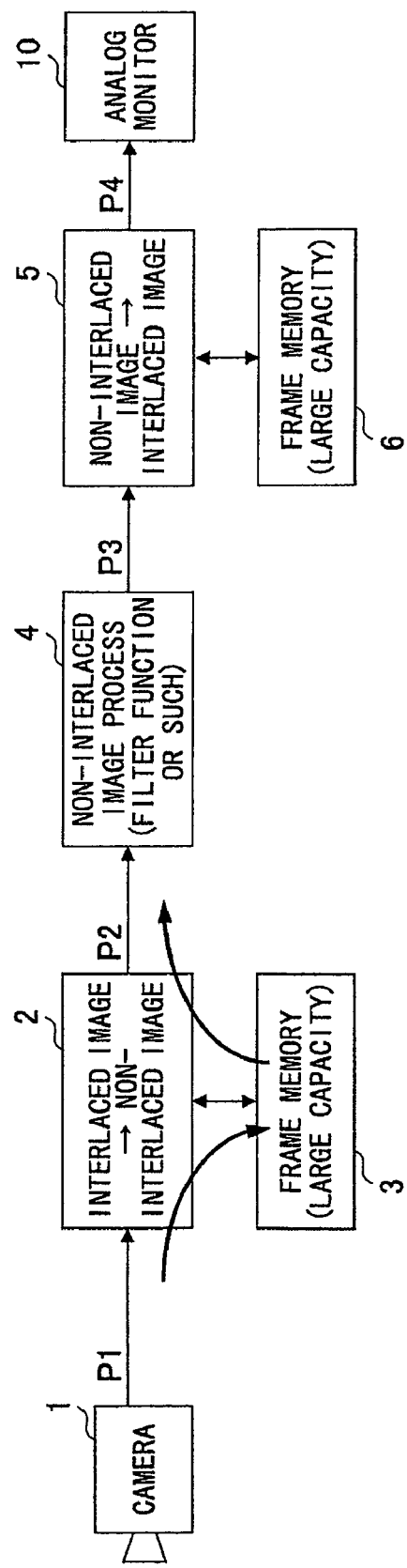

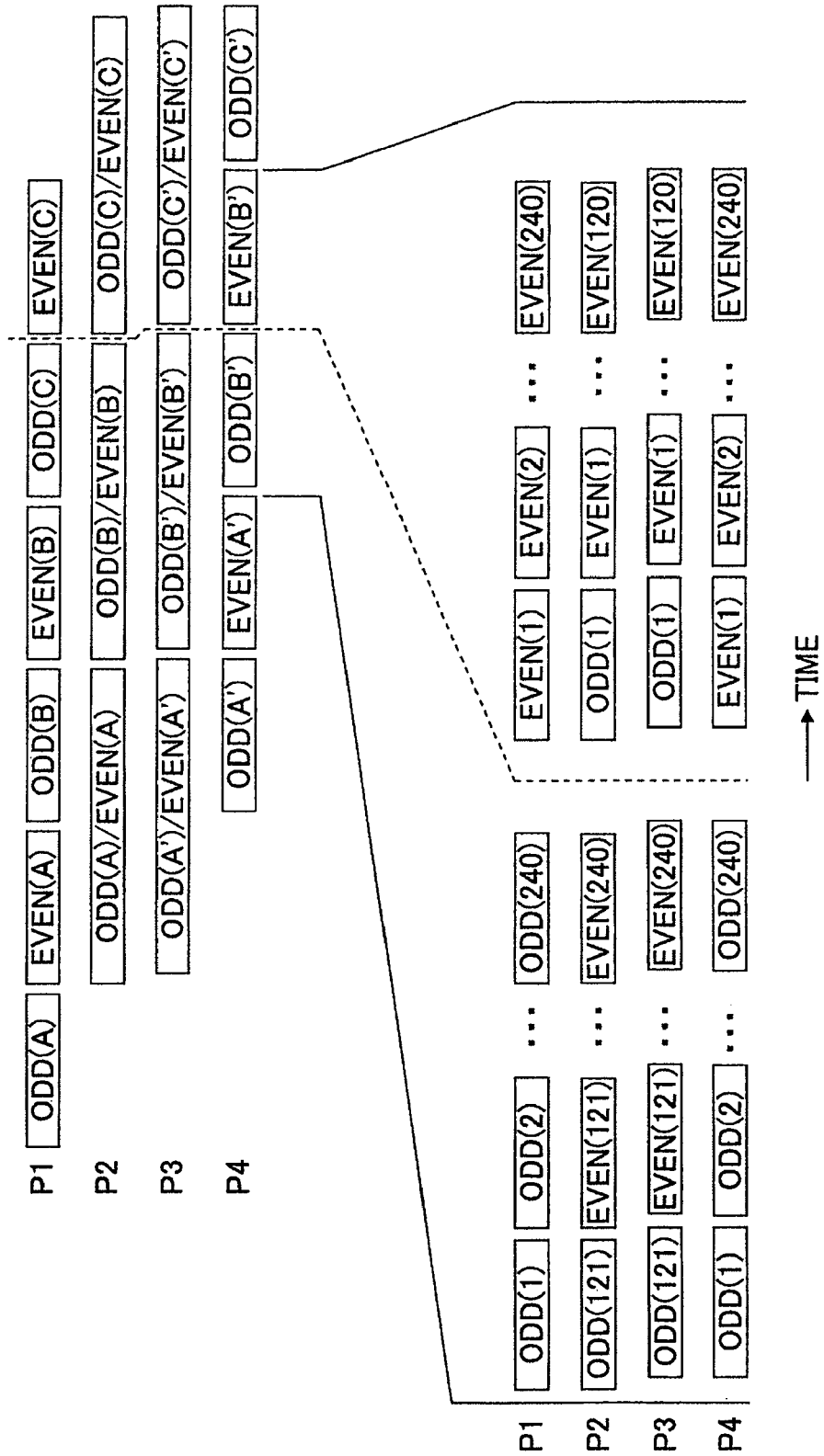

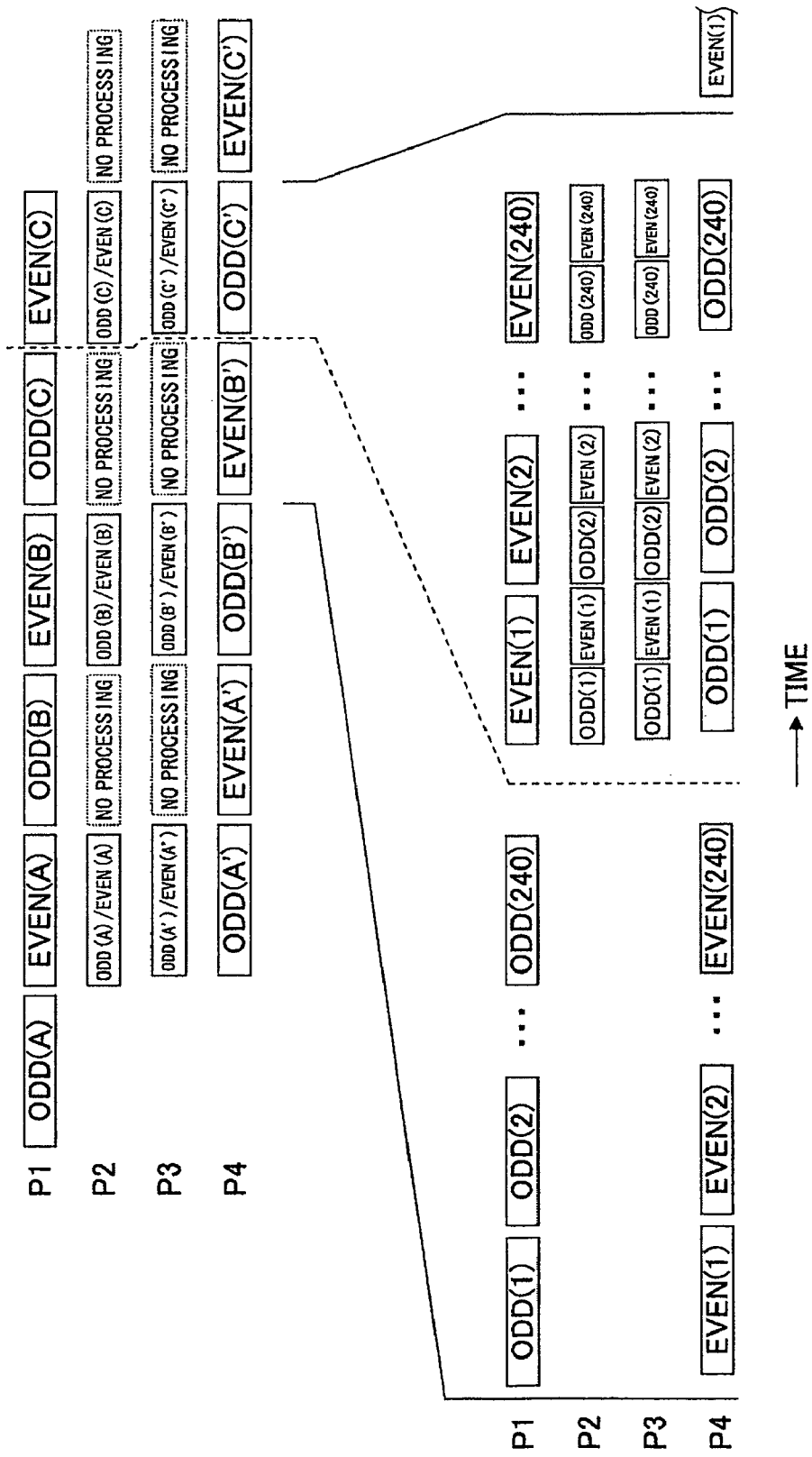

FIG.6D RELATED ART

| | |
|---|---|
| ■ 1 | ODD(1) |
| ■ ■ ■ ■ 2 | EVEN(1) |
| ■ ■ ■ 3 | ODD(2) |
| ■ ■ ■ ■ ■ ■ 4 | EVEN(2) |
| ■ ■ ■ ■ ■ 5 | ODD(3) |
| ■ ■ ■ ■ ■ ■ ■ ■ 6 | EVEN(3) |
| ■ ■ ■ ■ ■ ■ 7 | ODD(4) |
| ■ ■ ■ ■ ■ ■ ■ ■ ■ 8 | EVEN(4) |
| ⋮ | |
| ■ ■ ■ ■ ■ ■ ■ ■ ■ ■ ■ 479 | ODD(240) |
| ■ ■ ■ ■ ■ ■ ■ ■ ■ ■ ■ ■ ■ 480 | EVEN(240) |

FIG.7A

| | |
|---|---|
| ■ 1 | ODD(1) |
| ■ ■ ■ 2 | EVEN(1) |
| ■ ■ ■ 3 | ODD(2) |
| ■ ■ ■ ■ ■ 4 | EVEN(2) |
| ■ ■ ■ ■ 5 | ODD(3) |
| ■ ■ ■ ■ ■ ■ ■ 6 | EVEN(3) |
| ■ ■ ■ ■ ■ 7 | ODD(4) |
| ■ ■ ■ ■ ■ ■ ■ ■ 8 | EVEN(4) |
| ⋮ | |
| ■ ■ ■ ■ ■ ■ ■ ■ ■ ■ 479 | ODD(240) |
| ■ ■ ■ ■ ■ ■ ■ ■ ■ ■ ■ ■ 480 | EVEN(240) |

FIG.7B

| | | | | | | | | | | | | | | |
|---|---|---|---|---|---|---|---|---|---|---|---|---|---|---|
| □ ▽ 1 | | | | | | | | | | | | | | ODD(1) |
| ■ □ ▽ ▽ 2 | | | | | | | | | | | | | | EVEN(1) |
| ■ □ □ ▽ 3 | | | | | | | | | | | | | | ODD(2) |
| ■ ■ ■ □ ▽ ▽ 4 | | | | | | | | | | | | | | EVEN(2) |
| ■ ■ ■ □ □ ▽ 5 | | | | | | | | | | | | | | ODD(3) |
| ■ ■ ■ ■ ■ □ ▽ ▽ 6 | | | | | | | | | | | | | | EVEN(3) |
| ■ ■ ■ ■ ■ □ ▽ 7 | | | | | | | | | | | | | | ODD(4) |
| ■ ■ ■ ■ ■ ■ ■ □ ▽ ▽ 8 | | | | | | | | | | | | | | EVEN(4) |
| ⋮ | | | | | | | | | | | | | | |
| ■ ■ ■ ■ ■ ■ ■ ■ ■ ■ ■ □ □ ▽ 479 | | | | | | | | | | | | | | ODD(240) |
| ■ ■ ■ ■ ■ ■ ■ ■ ■ ■ ■ ■ □ ▽ ▽ 480 | | | | | | | | | | | | | | EVEN(240) |

FIG.8A

| | |
|---|---|
| ■ 1 | ODD(1) |
| ■ ■ ■ 2 | EVEN(1) |
| ■ ■ ■ 3 | ODD(2) |
| ■ ■ ■ ■ ■ 4 | EVEN(2) |
| ■ ■ ■ ■ ■ 5 | ODD(3) |
| ■ ■ ■ ■ ■ ■ ■ 6 | EVEN(3) |
| ■ ■ ■ ■ ■ ■ ■ 7 | ODD(4) |
| ■ ■ ■ ■ ■ ■ ■ ■ ■ 8 | EVEN(4) |
| ⋮ | |
| ■ ■ ■ ■ ■ ■ ■ ■ ■ ■ ■ ■ ■ 479 | ODD(240) |
| ■ ■ ■ ■ ■ ■ ■ ■ ■ ■ ■ ■ ■ ■ ■ 480 | EVEN(240) |

FIG.8B

| | |
|---|---|
| ☐ 1 | ODD(1) |
| ■ ☐ 1 | ODD(1) |
| ■ ■ ☐ 3 | ODD(2) |
| ■ ■ ■ ☐ 3 | ODD(2) |
| ■ ■ ■ ■ ☐ 5 | ODD(3) |
| ■ ■ ■ ■ ■ ☐ 5 | ODD(3) |
| ■ ■ ■ ■ ■ ■ ☐ 7 | ODD(4) |
| ■ ■ ■ ■ ■ ■ ■ ☐ 7 | ODD(4) |
| ⋮ | |
| ■ ■ ■ ■ ■ ■ ■ ■ ■ ■ ■ ☐ 479 | ODD(240) |
| ■ ■ ■ ■ ■ ■ ■ ■ ■ ■ ■ ■ ☐ 479 | ODD(240) |

FIG.8C

| | |
|---|---|
| ■ ■ ■ ☐ 2 | EVEN(1) |
| ■ ■ ■ ■ ☐ 2 | EVEN(1) |
| ■ ■ ■ ■ ■ ☐ 4 | EVEN(2) |
| ■ ■ ■ ■ ■ ■ ☐ 4 | EVEN(2) |
| ■ ■ ■ ■ ■ ■ ■ ☐ 6 | EVEN(3) |
| ■ ■ ■ ■ ■ ■ ■ ■ ☐ 6 | EVEN(3) |
| ■ ■ ■ ■ ■ ■ ■ ■ ■ ☐ 8 | EVEN(4) |
| ■ ■ ■ ■ ■ ■ ■ ■ ■ ■ ☐ 8 | EVEN(4) |
| ⋮ | |
| ■ ■ ■ ■ ■ ■ ■ ■ ■ ■ ■ ■ ☐ 480 | EVEN(240) |
| ■ ■ ■ ■ ■ ■ ■ ■ ■ ■ ■ ■ ■ ☐ | EVEN(240) |

| | |
|---|---|
| □ 1 | ODD(1) |
| ■ ■ ■ □ 2 | EVEN(1) |
| ■ ■ □ 3 | ODD(2) |
| ■ ■ ■ ■ ■ □ 4 | EVEN(2) |
| ■ ■ ■ ■ □ 5 | ODD(3) |
| ■ ■ ■ ■ ■ ■ ■ □ 6 | EVEN(3) |
| ■ ■ ■ ■ ■ ■ □ 7 | ODD(4) |
| ■ ■ ■ ■ ■ ■ ■ ■ ■ □ 8 | EVEN(4) |
| ⋮ | |
| ■ ■ ■ ■ ■ ■ ■ ■ ■ ■ ■ □ 479 | ODD(240) |
| ■ ■ ■ ■ ■ ■ ■ ■ ■ ■ ■ ■ ■ ■ □ 480 | EVEN(240) |

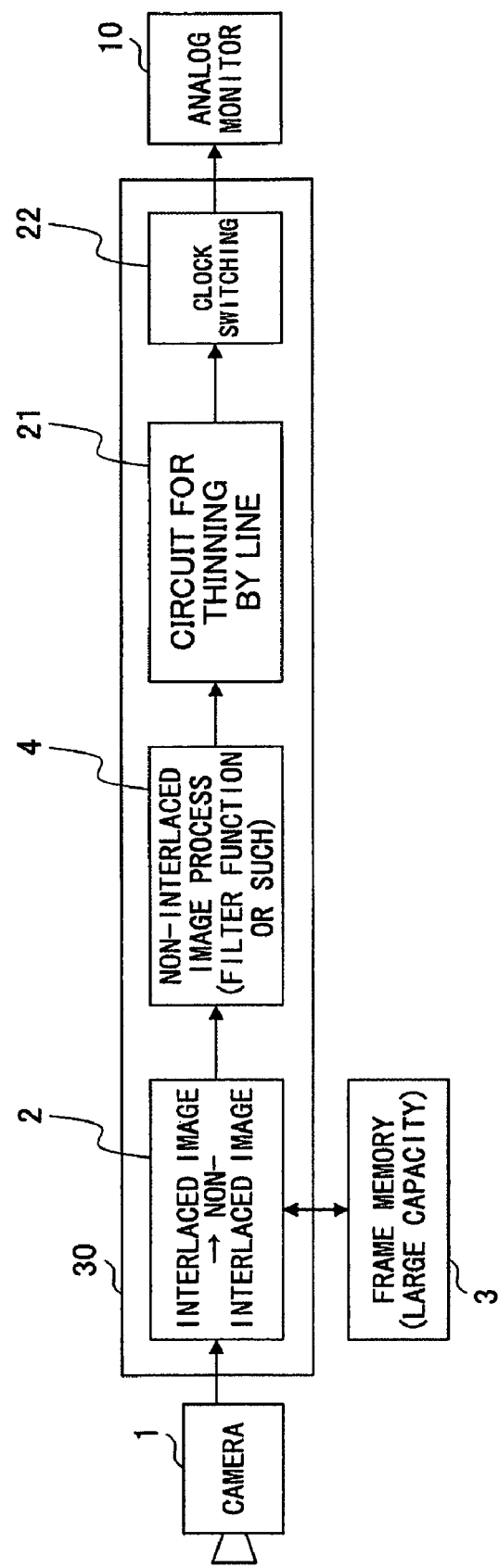

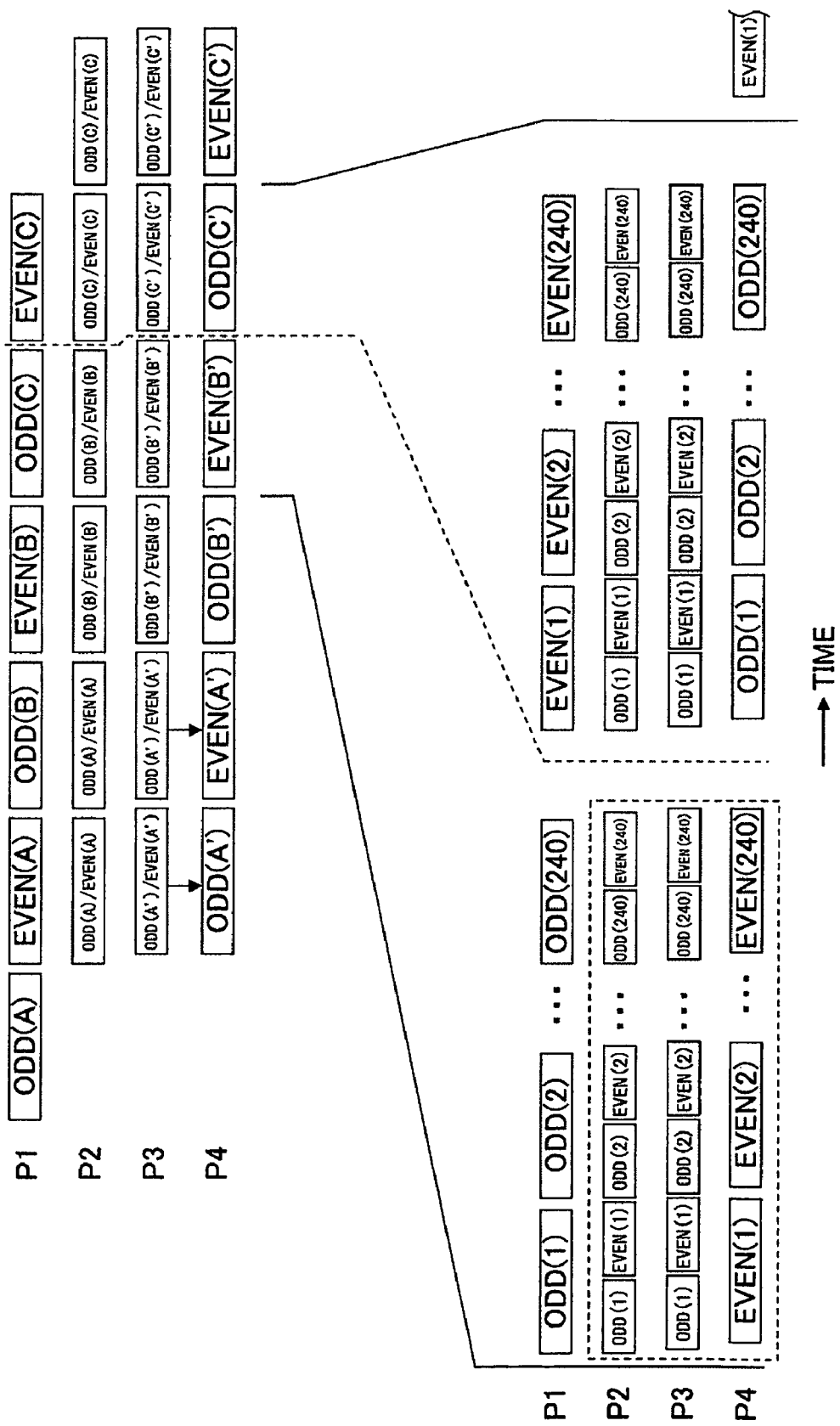

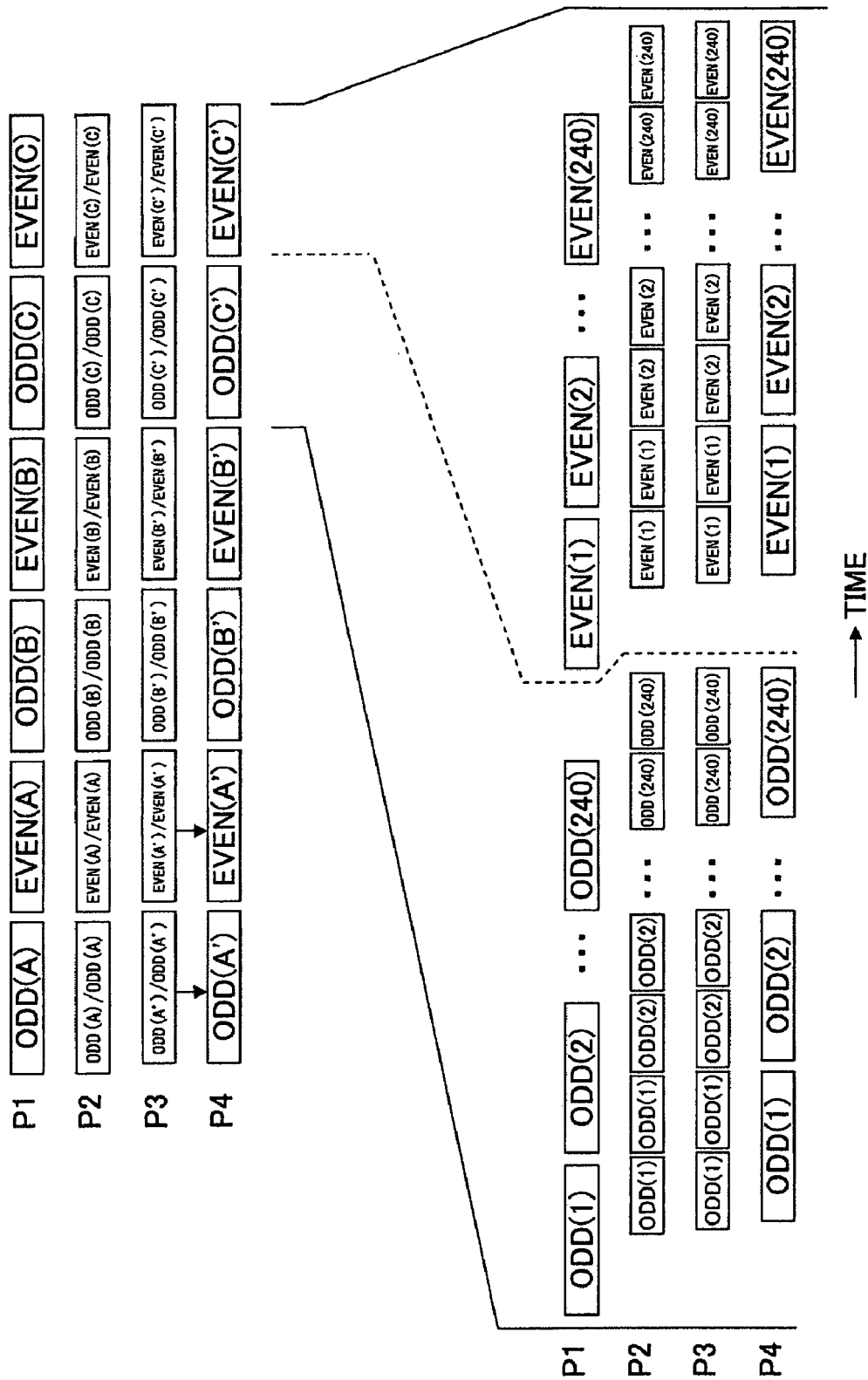

FIG.12A

| | |
|---|---|
| ■ 1 | ODD(1) |
| ■ ■ 2 | EVEN(1) |
| ■ ■ ■ 3 | ODD(2) |
| ■ ■ ■ ■ 4 | EVEN(2) |
| ⋮ | |
| ■ ■ ■ ■ ■ ■ ■ ■ 479 | ODD(240) |
| ■ ■ ■ ■ ■ ■ ■ ■ ■ 480 | EVEN(240) |

FIG.12B

| | |
|---|---|
| ■ 1 | ODD(1) |
| ■ ■ 2 | EVEN(1) |
| ■ ■ ■ 3 | ODD(2) |
| ■ ■ ■ ■ 4 | EVEN(2) |
| ⋮ | |
| ■ ■ ■ ■ ■ ■ ■ ■ 479 | ODD(240) |
| ■ ■ ■ ■ ■ ■ ■ ■ ■ 480 | EVEN(240) |

FIG.12D

| ■ 1 | | | | | | | | | ODD(1) |
| ■ ■ 2 | | | | | | | | | EVEN(1) |
| ■ ■ ■ 3 | | | | | | | | | ODD(2) |
| ■ ■ ■ ■ 4 | | | | | | | | | EVEN(2) |
| ⋮ | | | | | | | | | |
| ■ ■ ■ ■ ■ ■ ■ ■ 479 | | | | | | | | | ODD(240) |
| ■ ■ ■ ■ ■ ■ ■ ■ ■ 480 | | | | | | | | | EVEN(240) |

FIG.13A

| | | | | | | | | | |
|---|---|---|---|---|---|---|---|---|---|
| ■ 1 | | | | | | | | | ODD(1) |
| ■ ■ 2 | | | | | | | | | EVEN(1) |
| ■ ■ ■ 3 | | | | | | | | | ODD(2) |
| ■ ■ ■ ■ 4 | | | | | | | | | EVEN(2) |
| ⋮ | | | | | | | | | |
| ■ ■ ■ ■ ■ ■ ■ ■ 479 | | | | | | | | | ODD(240) |
| ■ ■ ■ ■ ■ ■ ■ ■ ■ 480 | | | | | | | | | EVEN(240) |

FIG.13B

| | | | | | | | | |
|---|---|---|---|---|---|---|---|---|
| ■ 1 | | | | | | | | ODD(1) |
| ■ 1 | | | | | | | | ODD(1) |
| ■ ■ ■ 3 | | | | | | | | ODD(2) |
| ■ ■ ■ 3 | | | | | | | | ODD(2) |
| ⋮ | | | | | | | | |
| ■ ■ ■ ■ ■ ■ ■ 479 | | | | | | | | ODD(240) |
| ■ ■ ■ ■ ■ ■ ■ 479 | | | | | | | | ODD(240) |

# IMAGE PROCESSING APPARATUS AND IMAGE PROCESSING METHOD

CROSS-REFERENCE TO RELATED APPLICATION

This application is a U.S. continuation application filed under 35 USC 111(a) claiming benefit under 35 USC 120 and 365(c) of PCT application JP2006/303321, filed Feb. 23, 2006. The foregoing application is hereby incorporated herein by reference.

BACKGROUND OF THE INVENTION

1. Field of the Invention

The present invention generally relates to an image processing apparatus and an image processing method. More particularly, the present invention relates to an image processing apparatus and an image processing method for carrying out image processing accompanied by conversion between a non-interlaced image signal and an interlaced image signal.

2. Description of the Related Art

So-called conversion of 'interlaced→non-interlaced→interlaced' is carried out in association with static image processing and moving picture processing (generically referred to as 'optional image processing', hereinafter) in a video camera apparatus or a digital camera apparatus (which may be generically referred to as a 'camera apparatus' hereinafter).

The conversion of 'interlaced→non-interlaced→interlaced' means a process of converting an interlaced image signal (described later) into a non-interlaced image signal, and then, returning the non-interlaced image signal into the interlaced signal.

Concerning a process of the conversion of 'interlaced→non-interlaced→interlaced', it is desired to reduce the number of parts/components required, to reduced required power consumption, and, to make it possible to easily obtain from image information an interlaced image to be displayed on a monitor or to be provided externally, and further, to make it possible to easily adapt to a period or clock timing at which an image is obtained by a camera device, and so forth.

These problems may be solved by improvement in LSI, FPGA or such (generically referred to as a 'integrated circuit' hereinafter) of a camera apparatus, integrated circuits provided in the periphery, external memories, integrated circuits for processing an image signal obtained from a camera device, and a method of controlling the external memories, provided for image processing.

FIGS. 1A through 1C illustrate an interlaced image signal format and a non-interlaced image signal format.

FIG. 1A illustrates an image on a monitor. As shown, in an example shown in FIG. 1A, an image (for one frame) on the monitor includes a total of 480 scan lines including 240 odd scan lines ODD(1) through ODD(240), and 240 even scan lines EVEN(1) through EVEN(240).

FIG. 1B illustrates an interlaced image signal.

As shown, an interfaced image signal is such that, in the above-mentioned total of 480 scan lines, an image signal of odd scan lines ODD(1) through ODD(240), i.e., 1st, 3rd, 5th, . . . , 479th scan lines are transmitted in sequence in the stated order, and after that, an image signal of even scan lines EVEN(1) through EVEN(240), i.e., 2nd, 4th, 6th, . . . , 480th scan lines are transmitted in sequence in the stated order. Such an arrangement of scan lines may be referred to as an interlaced arrangement, hereinafter, and an image signal having an interlaced arrangement may be referred to as an interlaced image signal.

FIG. 1C illustrates a non-interlaced image signal.

As shown, a non-interlaced image signal is such that the above-mentioned total of 480 scan lines are transmitted in the order, i.e., the odd scan line ODD(1), the even scan line EVEN(1), the odd scan line ODD(2), the even scan line EVEN(2), . . . , the odd scan line ODD(240), the even scan line EVEN(240). That is, the 1st, 2nd, 3rd, 4th, . . . , 479th and 480th scan lines of the image signal are transmitted in sequence in the stated order. Such an arrangement of scan lines may be referred to as a non-interlaced arrangement, hereinafter, and an image signal having a non-interlaced arrangement may be referred to as a non-interlaced image signal.

In a camera apparatus of the related art, when optional image processing is carried out on a static image or a moving picture taken by means of a camera device, the processing is carried out in the above-mentioned non-interlaced image signal state in many cases. On the other hand, when an image signal is provided to a display unit (simply referred to as a monitor), it is necessary to provide the image signal in the above-mentioned interlaced arrangement.

Therefore, it is necessary to convert a non-interlaced signal having undergone optical image processing into an interlaced signal to be provided to a monitor. Such conversion is carried out with the use of a memory (SDRAM, SRAM, DRAM, QDR, QDRII, RAM included in an integrated circuit or such). That is, the non-interlaced image is written in the memory in sequence, scan line by scan line. Then, reading is carried out from the memory in such an order to obtain an interlaced arrangement.

FIG. 2 shows an internal block diagram of a video camera apparatus in the related art.

An interlaced image signal taken by a camera device 1 shown in FIG. 2 is converted into a non-interlaced image signal by means of a circuit 2 for converting an interlaced image signal into a non-interlaced image signal (simply referred to as an 'interlaced to non-interlaced circuit' hereinafter) with the use of a frame memory 3. The non-interlaced image signal thus obtained undergoes optional image processing (i.e., a filter function process, an electronic zooming process or such) by means of an image processing part 4. After that, the non-interlaced image signal is converted into an interlaced image signal by means of a circuit 5 for converting a non-interlaced image signal into an interlaced image signal (simply referred to as an 'non-interlaced to interlaced circuit' hereinafter) with the use of a frame memory 6. Alternatively, a circuit 7 for converting a non-interlaced image signal into a VGA image signal may be used to convert the non-interlaced image signal into a VGA image signal.

The interlaced signal thus obtained is then transmitted to a connector 9 for externally providing the image signal or to an analog monitor 10 for displaying the image signal. On the other hand, the VGA image signal may be then transmitted to a connector 12 for externally providing the image signal or to a VGA monitor 11 for displaying the image signal. Alternatively, the image signal may be transmitted to a recorder 8 such as a hard disk recorder.

FIG. 3 shows a circuit configuration example for enabling monitoring an image signal which is in the middle of optical image processing, in comparison to the above-mentioned configuration of the video camera apparatus.

In the configuration of FIG. 3, the image processing part 4 of FIG. 2 is divided into image processing parts 4A and 4B. Image signals before and after undergoing optional image processing carried out by each of the image processing parts 4A and 4B are converted into interlaced signals by means of non-interlaced to interlaced circuits 5C, 5B and 5A, with the use of frame memories 6C, 6B and 6A, respectively. An image signal after being thus converted is transmitted to a respective one of externally providing connectors 9C, 9B and 9A, or to a respective one of analog monitors 10C, 10B and 10A.

FIGS. 4A, 4B and 4C illustrate flows of processing carried out by the respective functional blocks 2, 3, 4, 5 and 6 shown in FIG. 2.

As mentioned above, a static image or a moving picture taken by the camera device 1 corresponds to an interlaced signal, while optional image processing in the image processing part 4 is carried out on a non-interlaced image signal. The frame memory 3 is used for converting the interlaced image signal into the non-interlaced image signal.

That is, the interlaced to non-interlaced circuit 2 writes an interlaced image signal in the frame memory 3 in an order of being transmitted. Then, after the image signal is written in the frame memory 3 for one frame, the interlaced to non-interlaced circuit 2 reads the written image signal in such an order to obtain a non-interlaced arrangement. The thus-obtained non-interlaced image signal then undergoes optical image processing carried out by the image processing part 4. After that, the non-interlaced image signal is returned into an interlaced image signal by means of the non-interlaced to interlaced circuit 5 with the use of the frame memory 6. Thus, a total of the two frame memories 3 and 6 are required before and after the optical image processing for the purpose of signal conversion between the interlaced image signal and the non-interlaced image signal.

When an allowable delay time from an input image signal to an output image signal is equal to or more than 1 frame for example, optional image processing of the image processing part 4 carried out on a non-interlaced image signal is carried out at the same rate. Such a process will be simply referred to as a 'same rate process'. FIG. 4B shows a time chart of the same rate process. Below, with reference to figures, a flow of operation of an image processing apparatus carrying out optional image processing in a same rate process will be described.

In FIG. 4B, from the camera device 1 to a signal path P4, an odd image signal ODD(A) and an even image signal EVEN(A) for one frame are output in sequence. The odd image signal ODD(A) first transmitted is written in the frame memory 3 in sequence. After the completion thereof, the interlaced to non-interlaced circuit 2 reads the thus-written odd image signal ODD(A) from the frame memory 3, disposes the read odd image signal alternately with even scan lines of the even image signal EVEN(A) which is subsequently transmitted, scan line by scan line, in sequence, and outputs a non-interlaced image signal thus obtained to a signal path P2 (ODD(A)/EVEN(A)).

Thus, the interlaced image signal is converted into the non-interlaced image signal. The image processing part 4 carries out a same rate process on the thus-provided non-interlaced image signal to obtain a resulting image signal ODD(A')/EVEN(A').

A thus-obtained image signal (ODD(A')/EVEN(A')) having undergone optional image processing carried out by the image processing part 4 is output to a signal path P3, and then, is converted into an interlaced image signal by the non-interlaced to interlaced circuit 5.

Specifically, the non-interlaced image signal ODD(A')/EVEN(A') having undergone the optional image processing is written in the frame memory 6. After a first half of the non-interlaced image signal ODD(A')/EVEN(A') having undergone the optional image processing has been written in the frame memory 6, the non-interlaced to interlaced circuit 5 reads only odd scan lines of the odd image signal ODD(A') from the frame memory 6 in sequence, for a first half of odd scan lines of an interlaced image signal. After that, the non-interlaced to interlaced circuit 5 obtains odd scan lines ODD(A') of an interlaced image signal with the use of odd scan lines ODD(A') included in a second half of the non-interlaced image signal (ODD(A')/EVEN(A')) having undergone the optional image processing and transmitted subsequently, for a second half of odd scan lines of the interlaced image signal. The thus-obtained odd scan lines of the interlaced image signal are output to a signal path P4.

After that, the non-interlaced to interlaced circuit 5 reads even scan lines of the non-interlaced image signal having undergone the optional image processing which have been already written in the frame memory 6 for one frame at the present time, thus obtains even scan lines of the interlaced image signal, and outputs the thus-obtained even scan lines of the interlaced image signal to the signal path P4.

On the other hand, when an allowable delay time is one field, that is, when a delay of a signal from the signal path P1 to the signal path P4 should fall with one field, i.e., ½ frame, optional image processing should be carried out at a double rate. Such a process carried out at a double rate will be simply referred to as a double rate process, hereinafter. FIG. 5B shows a time chart of a double rate process.

In this case, different from the above-mentioned case of FIG. 4B, after writing odd scan lines ODD(A) included in a provided interlaced image signal in the frame memory 3, the interlaced to non-interlaced circuit 2 reads the thus-written odd scan lines, and disposes the read odd scan lines alternately with even image signal EVEN(A) subsequently transmitted, scan line by scan line. Thus, the interlaced to non-interlaced circuit 2 obtains a double rate non-interlaced image signal, which is then output to the signal path P2.

In this case, the non-interlaced to interlaced circuit 5 writes even scan lines EVEN(A') included in a non-interlaced image signal ODD(A')/EVEN(A') having undergone optional image processing of the image processing part 4, and provides odd scan lines ODD(A') to the signal path P4. After that, the non-interlaced to interlaced circuit 5 reads the written even scan lines EVEN(A') from the frame memory 6. Thus, an interlaced image signal ODD(A')/EVEN(A') is provided to the signal path P4 with a delay of one field.

Further, as in the circuit example of FIG. 3, in a case where an image signal which is in the middle of optical image processing is to be extracted, a memory 7B is separately required for converting a non-interlaced images signal into an interlaced image signal. By sharing for this purpose the memory 7A which is originally used after the optional image processing is carried out, it may be possible to omit the necessity of such an extra memory. However, in this method, it is not possible to output an image signal having undergone the optional image processing to the monitor when the image signal in the middle of the optional image processing is extracted. As another method, control of a memory may be made in a time division manner such that both image signals before and after undergoing the optional image processing are output to the monitors. However, even in this method, there is a limitation to output image signals to many monitors simultaneously.

Further, generally speaking, there are two different periods or clock timing to obtain an image by a camera device, i.e., a 30-Hz period and a 60-Hz period. As shown in FIG. 1A, one page or one frame of image includes odd scan lines and even scan lines. In this case, there are a 60-Hz method and a 30-Hz method as will be described below. That is, in the 60-Hz method, an image is obtained at 60 Hz, and, with this timing being kept, an image only including odd scan lines and an image only including even scan lines are extracted alternately. In the 30-Hz method, an image is obtained at 30 Hz, the thus-obtained image is decomposed into an odd scan line image and an even scan line image, and the thus-obtained images are output in sequence in a time-series manner at 60 Hz.

In the 60-Hz method, odd scan lines and even scan lines alternately extracted have different times at which the images have been taken by a camera device. Therefore, when a non-interlaced image signal is obtained from conversion with the use of the odd scan lines and even scan lines, the images having the different times of being taken by the camera device are combined in such a manner that corresponding scan lines are adjacently disposed alternately. FIGS. 6B through 6D show an outline of an image obtained in this case, and FIG. 6A shows a time chart illustrating a change in the image along a time axis.

When images having different times of being taken by a camera device are thus combined into one image as mentioned above in such a manner that corresponding scan lines are adjacently disposed alternately (in FIG. 6A, O1 and E1, O3 and E4), the states of images OE12, OE34 shown FIG. 6A occur.

Assuming a case where a moving picture of an object currently moving rightward in the FIG. 6A is taken by a camera device, an image O1 including only odd scan lines (FIG. 6B) taken by the camera device in early timing and an image E1 including only even scan lines (FIG. 6C) taken by the camera device in timing delayed by timing corresponding to 60 Hz, are compared. Then, As shown in FIGS. 6A and 6B, the object has shifted rightward in FIG. 6C in comparison to FIG. 6B. As a result, when both are combined and a non-interlaced image signal is thus obtained, a contour of the object is in a saw-tooth state OE12 or OE23 as shown in FIG. 6D.

When an electronic zooming process as optional image processing is carried out on the thus-obtained non-interlaced image signal, a saw-tooth noise may occur in a resulting moving picture due to the above-mentioned difference in the time at which the images have been taken by the camera device. Similarly, when a filter process is carried out, a calculation error may occur in an integrated value. Such noise may occur as a result of, as shown in a part defined by a broken line of FIG. 6D for example, a contour of the object, which should be originally linear, changing to have saw tooth as mentioned above, then the optional image processing being carried out thereon, and further, the image signal being then converted into an interlaced image signal.

Japanese Laid-Open Patent Applications Nos. 62-217287 and 6-261299 and Japanese Patent No. 2731639 disclose related arts.

SUMMARY OF THE INVENTION

The present invention has been devised in consideration of the above-mentioned problems and an object of the present invention is to provide a configuration such that, in an image processing apparatus or an image processing method including so-called 'interlaced→non-interlaced→interlaced' conversion, it is possible to minimize memory resources required for the conversion. Another object of the present invention is to provide a configuration such that, in an image processing apparatus or an image processing method including so-called 'interlaced→non-interlaced→interlaced' conversion, even in the 60-Hz method, generation of noise or such caused due to optional image processing can be effectively reduced In one embodiment, a non-interlaced image signal is generated at a double rate by each frame and thus, a double-rate non-interlaced signal which has identical information duplicately is generated twice. Then, after a predetermined process (i.e., for example, optional image processing) is carried out on the double-rate non-interlaced signal thus generated twice, odd scan lines are extracted from one of the twice generated double-rate non-interlaced signal to generate an odd scan line image signal, even scan lines are extracted from the other of the twice generated double-rate interlaced signal to generate an even scan line image signal, so as to obtain an interlaced image signal for the frame.

In this configuration, the double-rate non-interlaced image signal is generated twice, and, after optional image processing or such is carried out, odd scan lines are extracted from one of the twice generated double-rate non-interlaced signal to generate an odd scan line image signal, even scan lines are extracted from the other of the twice generated double-rate non-interlaced signal to generate an even scan line image signal, so as to obtain an interlaced image signal for the frame from the thus-obtained odd scan line image signal and even scan line image signal. As a result, no frame memory is required for converting the non-interlaced image signal into the interlaced image signal.

In the interlaced image signal thus finally obtained, as shown in FIG. 1B, odd scan lines are disposed in a first-half field interval of one frame, and even scan lines are disposed in a second-half field interval.

In this configuration, a double-rate non-interlaced image signal is such that, in each one of the first-half and second-half field intervals, information for one frame is completely included. Therefore, as mentioned above, the odd scan lines included in the first-half field interval are extracted, the even scan lines included in the second-half field interval are extracted, and therewith, the above-mentioned desired interlaced image signal can be obtained. In this configuration, because an interlaced image signal can be obtained merely as a result of extraction. Therefore, it is not necessary to buffer the image signal, and thus, no frame memory is required as mentioned above.

In another embodiment of the present invention, a double-rate and double odd scan line image signal, having identical information duplicately, scan line by scan line, is generated from an odd scan line image signal included in an interlaced image signal. Further, a double-rate and double even scan line image signal, having identical information duplicately, scan line by scan line, is generated from an even scan line image signal included in the interlaced image signal. Then, after a predetermined process is carried out, odd scan lines for one field are extracted from the double-rate and double odd scan line image signal, and even scan lines for one field are extracted from the double-rate and double even scan line image signal, to obtain an interlaced image signal for the frame.

In this configuration, the double-rate and double odd scan line image including identical information duplicately, scan line by scan line, and the double-rate and double even scan line image including identical information duplicately, scan line by scan line, are generated. These signals have, in a first-half field interval, a double-rate and double odd scan line image having the identical information duplicately, scan line by scan line, and also, have, in a second-half field interval, a double-rate and double even scan line image having the identical information duplicately, scan line by scan line. Therefore, after optional image processing is carried out, one set of odd scan lines are extracted from the double odd scan lines included in the first-half field interval, one set of even scan lines are extracted from the double even scan lines included in the second-half field interval, and therefrom, a desired interlaced image signal can be obtained.

Also in this case, no frame memory is required because merely extraction is required and buffering of an image signal is not necessary.

Further, in this case, in the 60-Hz method, instead of combining image signals having different times at which corresponding images have been taken by a camera device, an image signal delicately having odd scan lines of the same time or an image signal delicately having even scan lines of the same time is used. Therefore, noise generation due to optional image processing can be effectively avoided.

Thus, according to the present invention, an interlaced image signal is given, and an interlaced image signal having undergone optional image processing is output. In this process, it is possible to minimize required memory resources. Also, even in the 60-Hz method, it is possible to effectively avoid noise generation in optional image processing.

BRIEF DESCRIPTION OF DRAWINGS

FIGS. 1A, 1B and 1C illustrate an interlaced image signal and a non-interlaced image signal;

FIGS. 4A, 4B, 5A and 5B illustrate image processing apparatuses in examples of the related art;

FIGS. 6A, 6B, 6C, 6D, 7A and 7B illustrate a problem in image processing in the related art;

FIGS. 8A, 8B, 8C and 8D illustrate an advantage of an embodiment;

FIG. 9A shows a functional block diagram of a first embodiment;

FIGS. 10A and 10B illustrate a flow of signal processing in an embodiment (first method);

FIGS. 11A and 11B illustrate a flow of signal processing in an embodiment (second method);

FIGS. 12A, 12B, 12C, 12D and 12E illustrate states of image signals in the embodiment (first method); and FIGS. 13A, 13B, 13C, 13D and 13E illustrate states of image signals in the embodiment (second method).

DETAILED DESCRIPTION OF THE PREFERRED EMBODIMENTS

Figure 1B:
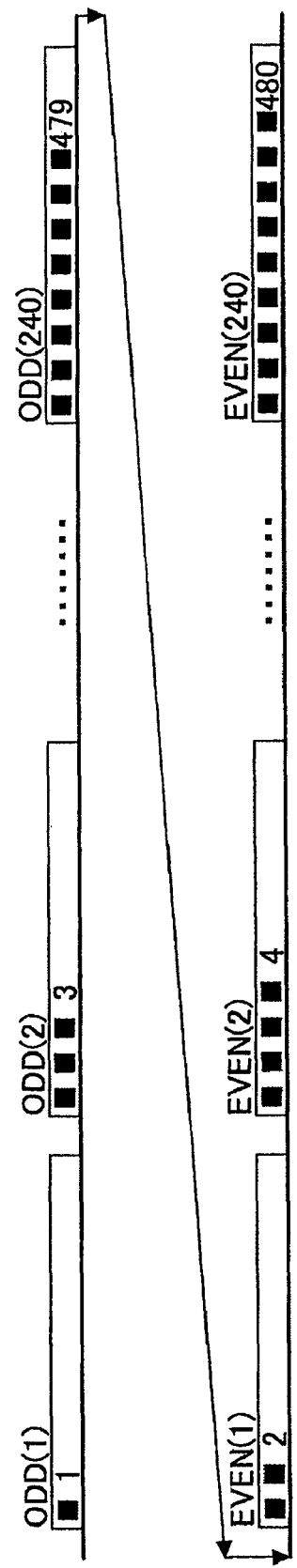
Figure 1C:
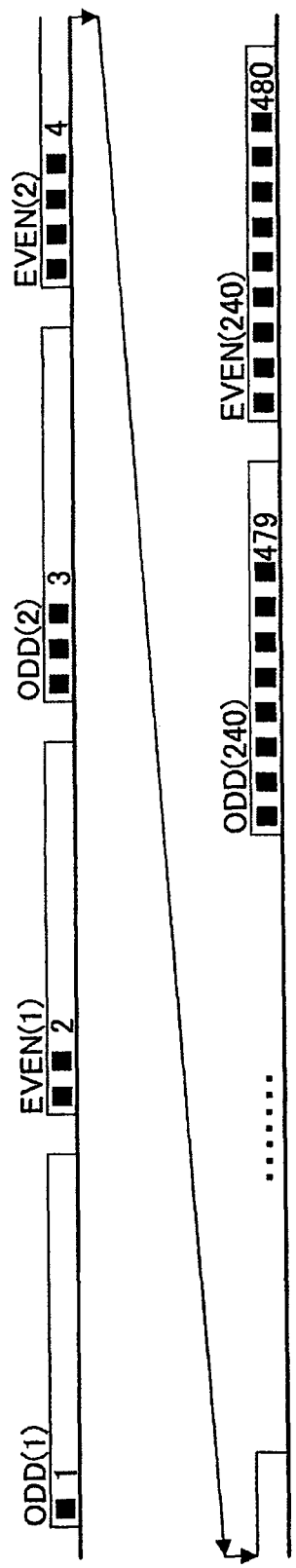
Figure 2:
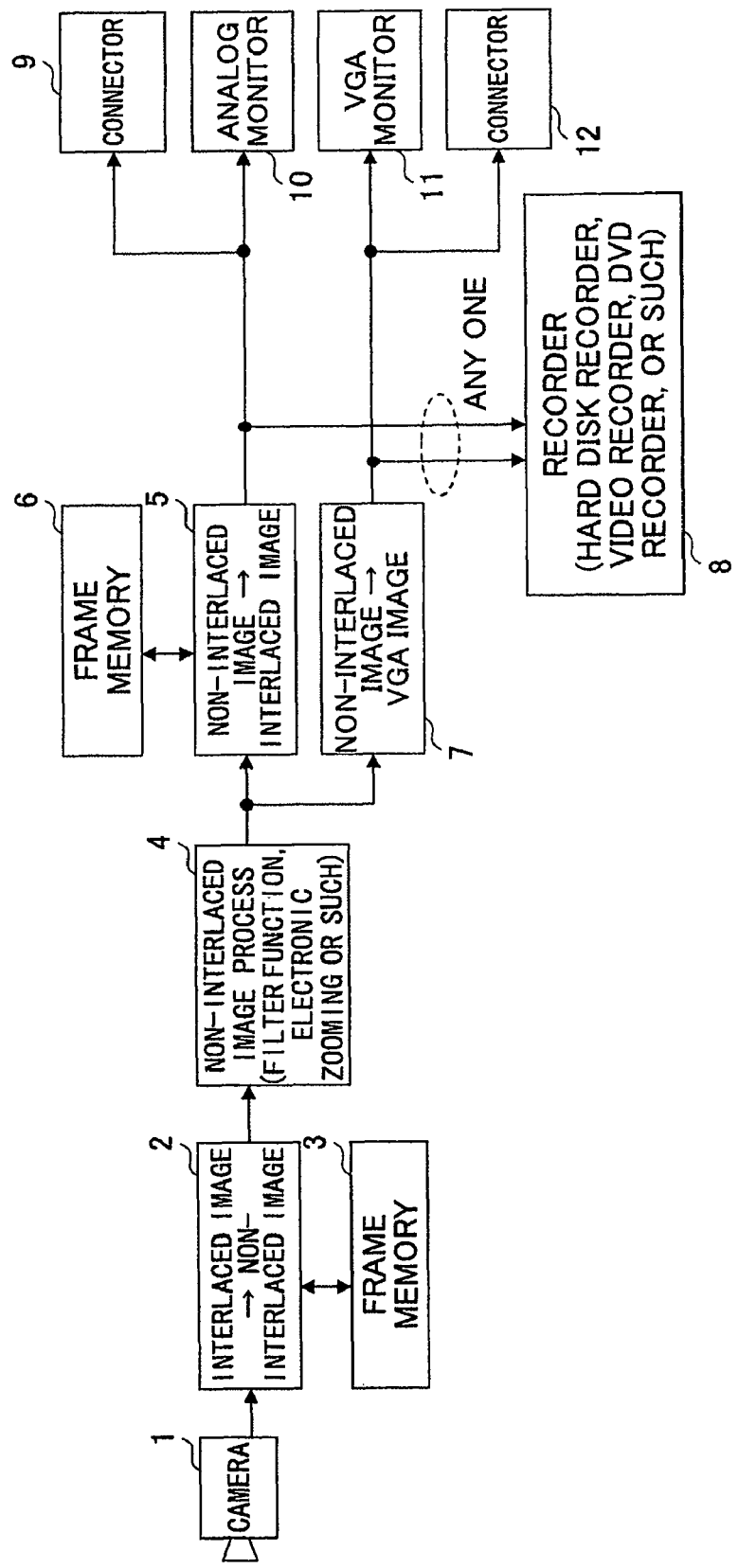
FIGS. 2 and 3 illustrate common configurations of video camera apparatuses.

Embodiments will be described below.

According to one embodiment, in conversion from an interlaced image signal into a non-interlaced image signal, for a function of carrying out optional image processing on an image signal having a non-interlaced arrangement, an image signal having a non-interlaced arrangement is read twice from a memory in which an interlaced image signal has been written. The image signal to be read includes two sets of scan lines. First set of scan lines, read from the memory first, includes 480 scan lines including ODD(1), EVEN(1), ODD(2), EVEN(2), ..., ODD(240), EVEN(240), i.e., the first, second, third, fourth, ..., 479th, and 480th lines, read in the stated order. The second set of scan lines has the same contents and is read second in the same order. A rate of the reading is twice a rate of the original image signal.

These two sets of image signals each having a non-interlaced arrangement undergo optional image processing, and after that, resulting image signals are converted into an interlaced image signal. In this case, from the first set of scan lines, only odd scan lines, i.e., ODD(1), ODD(2), ... are output, with even scan lines EVEN(1), EVEN(2), ... not output. On the other hand, from the second set of scan lines, only even scan lines, i.e., EVEN(1), EVEN(2), ... are output, with odd scan lines ODD(1), ODD(2), ... not output. This method will be referred to as a first method. As to the first method, further description will be made later with reference to FIGS. 10A, 10B, 12A, 12B, 12C, 12D and 12E.

In the first method, when an image signal having a non-interlaced arrangement is converted into an interlaced image signal, it is possible to use a configuration not requiring a memory by using a clock switching circuit, or, to use a configuration using a memory having a small capacity required for clock switching. As a result, a memory having a capacity for one field, one frame or more is not required.

According to another embodiment, for a function of carrying out optional image processing on an image signal having a non-interlaced arrangement, two sets of 'image signals having pseudo interlaced arrangements' are obtained in a time-series manner from a memory in which an interlaced image signal has been written. A first set includes only odd scan lines having been read duplicately, scan line by scan line in sequence, from the memory. That is, this first set includes a total of 480 scan lines ODD(1), ODD(1), ODD(2), ODD(2), ..., ODD(240), ODD(240), i.e., 1st, 1st, 3rd, 3rd, 5th, 5th, ..., 479th, 479th scan lines, read in sequence in the stated order. In the same way, the second set includes a total of 480 scan lines EVEN(1), EVEN(1), EVEN(2), EVEN(2), ..., EVEN(240), EVEN(240), i.e., 2nd, 2nd, 4th, 4th, 6th, 6th, ..., 480th, 480th scan lines, read in sequence in the stated order. A rate of the reading of the first and second sets is twice a rate of the original image signal.

When these two sets of image signals having pseudo non-interlaced arrangements, having undergone optional image processing, are converted into an image signal having an interlaced arrangement, scan lines are extracted from the first set which includes, as mentioned above, scan lines of the same numbers duplicately, alternately so that duplication does not occur. That is, only the odd scan lines ODD(1), ODD(2), ..., i.e., 1st, 3rd, 5th, ... scan lines are obtained. In the same way, scan lines are extracted from the second set which includes, as mentioned above, scan lines of the same numbers duplicately, alternately so that duplication does not occur. That is, only the even scan lines EVEN(1), EVEN(2), ..., i.e., 2nd, 4th, 6th, ... scan lines are obtained. This method will be referred to as a second method. As to the second method, further description will be made later with reference to FIGS. 11A, 11B, 13A, 13B, 13C, 13D and 13E.

In the second method, when the image signals having pseudo non-interlaced agreements are converted into an interlaced image signal, it is possible to necessary to use a memory, the same as above, or, a memory having a small capacity merely required for clock switching may be used. As a result, it is possible to omit a memory having a large size corresponding to one field, one frame, or more.

It is noted that, as mentioned above, when optional image processing such as a filter process or an electronic zooming process, is carried out, the process is carried out on a given image signal in a state of non-interlaced arrangement in almost all cases. After that, in order to output the thus-processed image signal to a monitor or such, it is necessary to convert the image signal into an image signal having a non-interlaced arrangement as mentioned above. For this propose, as mentioned above, in the related art, the image signal is first buffered in a memory, then, reading is carried out therefrom to change an order of the scan lines to obtain an interlaced arrangement. However, according to the embodiments, as mentioned above, the above-mentioned memory used for buffering can be omitted, as a result of, necessary scan lines of an image signal being provided in necessary timing.

That is, a non-interlaced image signal and an interlaced image signal are different from one another in their arrangements of odd scan lines and even scan lines. Then, by providing two sets of image signals each having a non-interlaced arrangement at a double rate, that is according to the above-mentioned first method, it is possible to obtain an interlaced image signal, as mentioned above.

For this purpose, a total of 480 scan lines having an arrangement in an order of ODD(1), EVEN(1), ODD(2), EVEN(2), . . . , ODD(240), EVEN(240) are read at a double rate. This process can be carried out as a result of, with the use of a circuit for generating one set of an image signal having a non-interlaced arrangement, and the process being carried out at a double rate. Thereby, it is possible to generate one frame of an image signal within a time of ½ frame interval. Then, with the use of the remaining time of ½ frame interval, a second set of an image signal having a non-interlaced arrangement of the same contents can be provided redundantly. Then, after optional image processing is carried out on these two sets of image signals, only odd scan lines are extracted from the first set of image signal and only even scan lines are extracted from the second set of image signal, so that an interlaced image signal can be obtained without carrying out buffering.

Thus, in the first method, as a result of thus preparing an extra set of image signal having a non-interlaced arrangement, it is possible to easily provide a configuration such that, with the use of an existing double-rate image processing circuit, no special memory as buffering means for converting a non-interlaced image signal into an interlaced image signal is required.

Figure 5A:
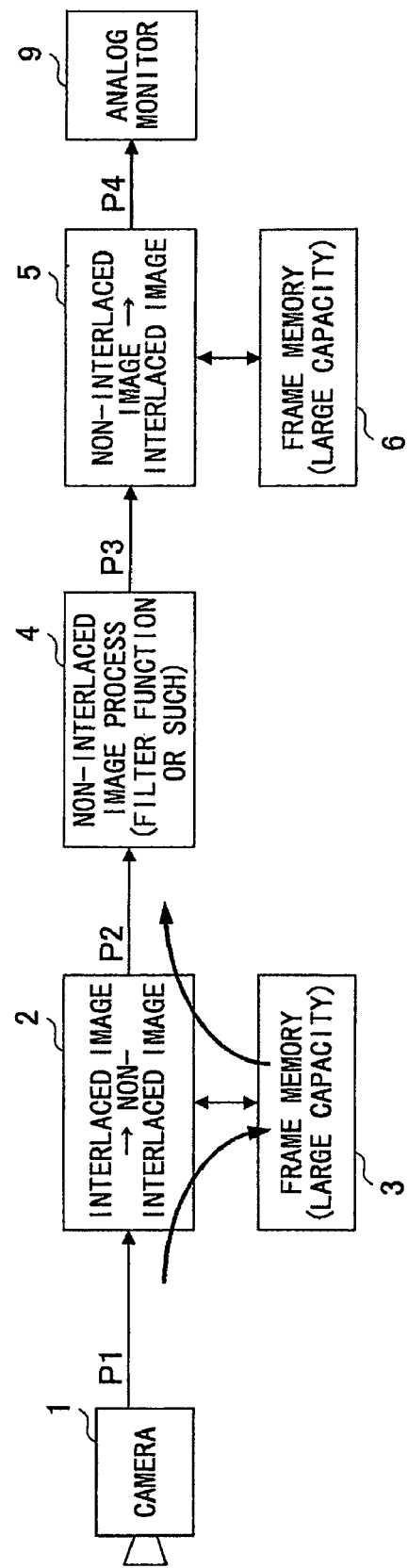
Figure 6A:
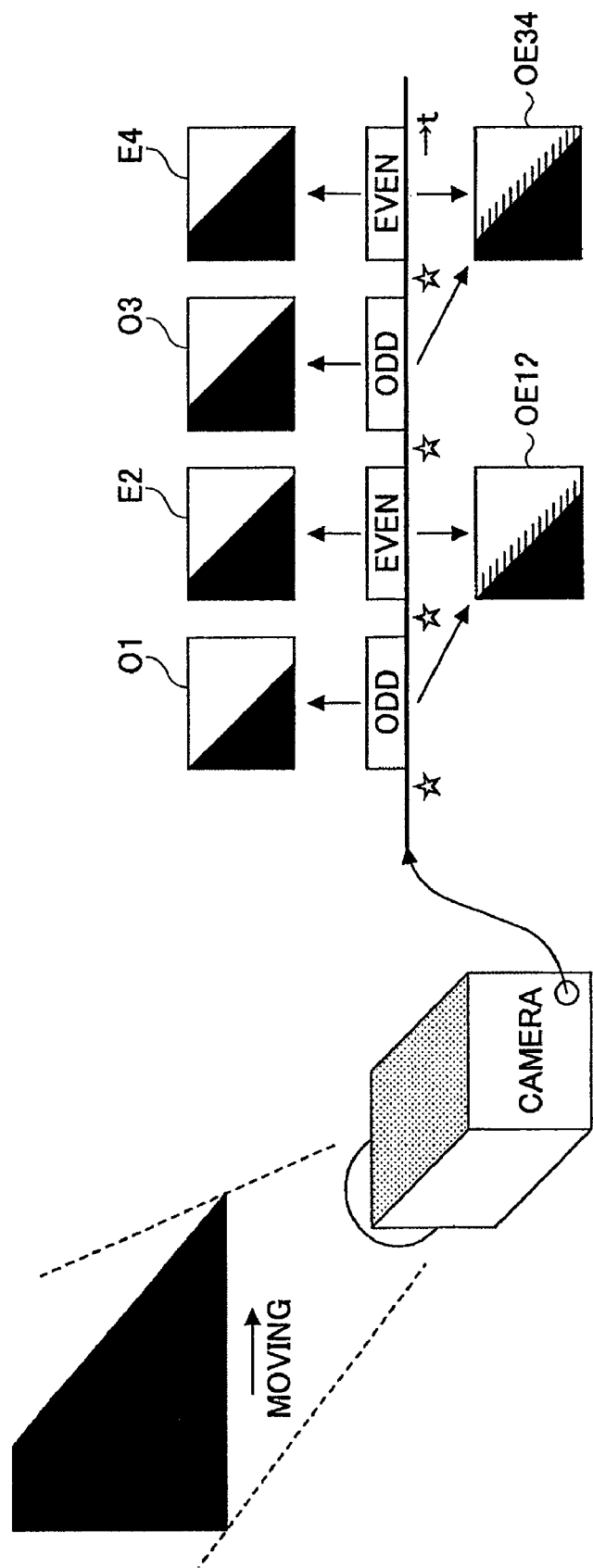
Figure 6B:
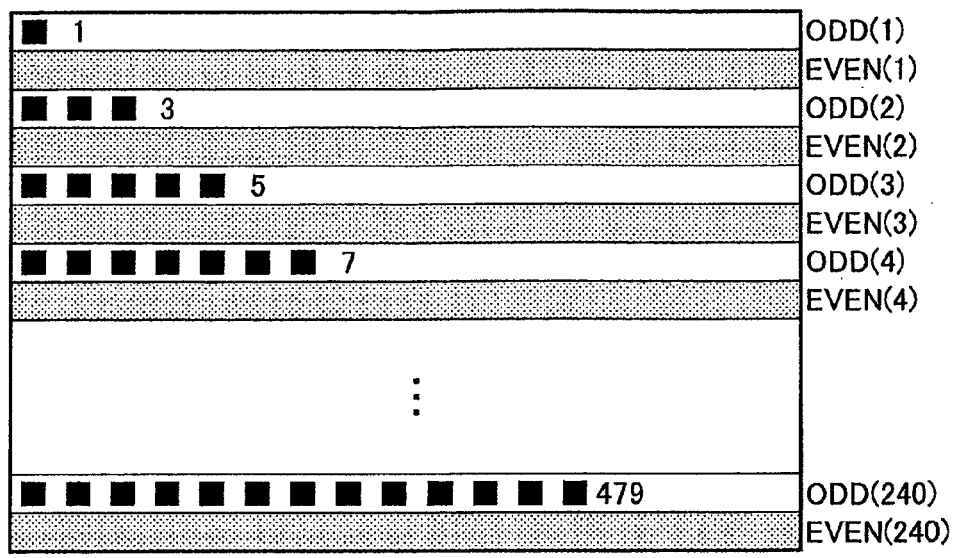
Figure 6C:
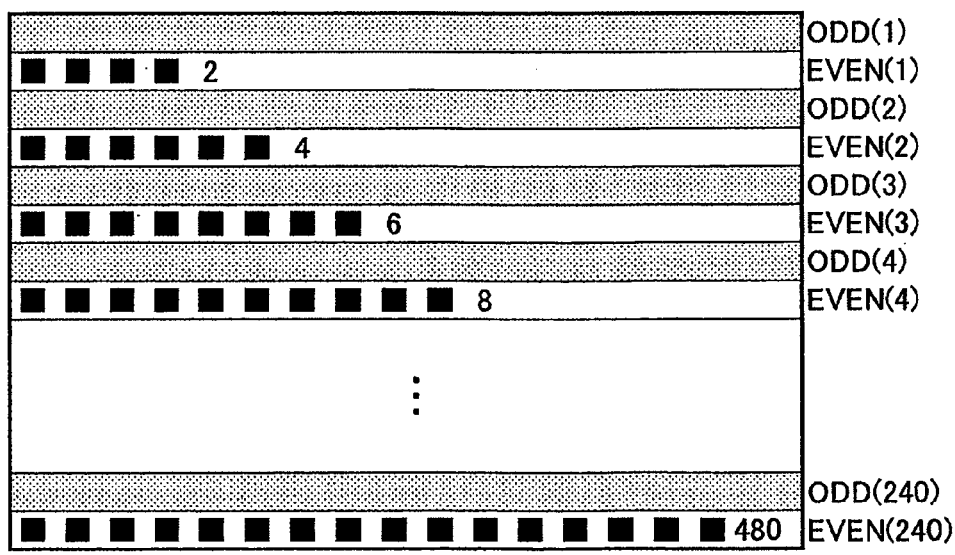

To thus prepare an extra set of image signal having a non-interlaced arrangement with the use of an existing double-rate image processing circuit can be easily carried out. That is, in the method of carrying out a double rate process in the related art shown in FIG. 5B, a double-rate non-interlaced image signal ODD(A)/EVEN(A) is obtained from an interlaced image signal directly obtained from a camera device 1, and after that, from a frame memory 3, the image signal is read so as to obtain the image signal having the same scan line arrangement. In this method, a memory of a second stage is not necessary, and thus, it is possible to halve the number of required parts/components.

Further, it is possible to provide a configuration to easily switch between the above-mentioned first and second methods. As mentioned above, the first method is a method in which two sets of double-rate image signals each having a non-interlaced arrangement are generated. The second method is a method in which two sets of image signals each having a pseudo non-interlaced arrangement. In the second method, a first set of a double-rate image signal has odd scan lines in which the same scan lines are duplicately included, and a second set of a double-rate image signal has even scan lines in which the same scan lines are duplicately included.

This switching can be achieved merely by means of changing upper addresses in a memory from which an image signal is read. For example, assuming that addresses of an interlaced image signal written in a frame memory are 0000, 0001, 0002, . . . (odd scan lines), and 1000, 1001, 1002, . . . (even scan lines), the first method can be achieved by reading in an order of 0000, 1000, 0001, 1001, . . . , in which odd scan lines and even scan lines are read alternately. In this case, the highest addresses are 0, 1, 0, 1, . . . , as shown. Then, by changing only the highest addresses into 0, 0, 0, 0, . . . , scan lines to be read become 0000, 0000, 0001, 0001, . . . . Thus, in this case, it is possible to read only the odd scan lines duplicately, as shown. Thus, switching from the first method into the second method is carried out.

As mentioned above, in the second method, as a first set, a total of 480 scan line are read having an arrangement or an order of ODD(1), ODD(1), ODD(2), ODD(2), . . . , ODD(240) and ODD(240). Then, as a second set, a total of 480 scan line are read having an arrangement or an order of EVEN(1), EVEN(1), EVEN(2), EVEN(2), . . . , EVEN(240) and EVEN(240).

In the second method, even in a case where a provided interlaced image signal is of the above-mentioned 60-Hz method, that is, an image of only odd scan lines and an image of only even scan lines are different in their times at which images have been taken by a camera device, it is possible to avoid noise which may otherwise occur due to optional image processing. That is, the scan lines included in the above-mentioned first and second sets are such that, the first set includes only the odd scan lines and the second set includes only the even scan lines. As a result, in each set of the first and second sets, only the scan lines having the same time at which the image has been taken are included. Therefore, by carrying out optional image processing on each set of the image signal having a pseudo non-interlaced arrangement, it is possible to positively avoid noise described above with reference to FIGS. 6A, 6B, 6C and 6D.

Therefore, the first method may be used for the above-mentioned 30-Hz method and the second method may be used for the above-mentioned 60-Hz method.

As mentioned above, merely by changing upper addresses of a memory, it is possible to easily switch into the second method from the first method. Therefore, it is possible to easily respond to each of respective operation modes of respective camera devices of the above-mentioned 30-Hz method and 60-Hz method (see a third embodiment shown in FIG. 9C, described later).

In so-called 'interlaced→non-interlaced→interlaced' conversion, in the related art, a first memory for converting an interlaced image signal into a non-interlaced image signal and a second memory for converting a non-interlaced image signal into an interlaced image signal are required According to the embodiments, the second memory can be omitted. Thus, it is possible to reduce the number of required parts/components.

In the embodiments, as mentioned above, in order to convert an interlaced image signal to a non-interlaced image signal, two sets of image signals each having a non-interlaced arrangement (i.e., in the first method) or image signals each having a pseudo non-interlaced arrangement (i.e., in the second method) are read from a memory. Therefore, the required number of times of reading operation is twice. However, generally speaking, the memory is mounted externally of a FPGA or an ASIC. Therefore, an advantage of thus reducing the number of the required memories is larger because the number of required input/output pins of the FPGA or ASIC can be reduced accordingly and thus, power consumption can also be reduced. Consequently, it is possible to reduce the overall power consumption.

Figure 3:
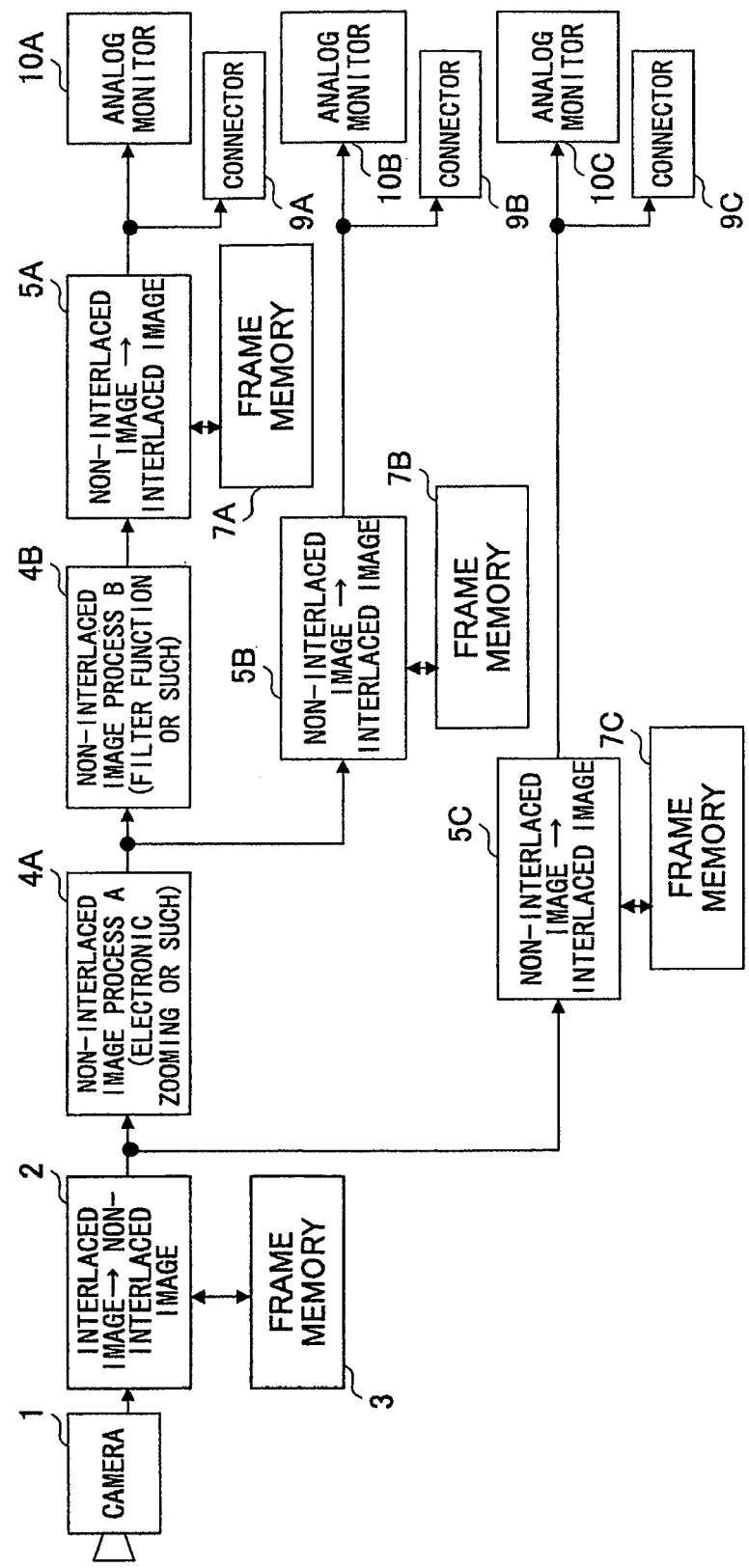

Further, extracting of an interlaced image signal from image signals each having a non-interlaced arrangement (first method) or image signals each having a pseudo non-interlaced arrangement (second method) can be realized easily by a circuit of a relatively small size. Therefore, it is possible to easily switch a monitor used for monitoring an image signal in the middle of optional image processing (see FIG. 3).

Further, it is also possible to easily carry out switching of a method to obtain an image from a camera device, i.e., switching between the 30-Hz method and the 60-Hz method, without actually changing a configuration itself of a circuit used for processing optional image processing. Therefore, it is possible to easily apply an existing image processing circuit.

FIGS. 7A and 7B illustrate a problem occurring when a non-interlaced image signal is generated as a result of odd scan lines and even scan lines corresponding to different times at which images have been taken by a camera device being combined together, and optional image processing such as a filter process or an electronic zooming process is carried out.

That is, a case is assumed in which, an image (shown in FIG. 7A) obtained from combining scan lines having different times at which images have been taken by a camera device together undergoes a filter process. In such a case, for example, corrections shown in FIG. 7B are carried out. In FIG. 7B, corrections indicated by ∇ (i.e., a white inverted triangle) symbols mean erroneous corrections consequently, and corrections indicated by □ (i.e., a white rectangle) symbols mean allowable corrections consequently.

That is, in the filter process, for example, such corrections are carried out that a contour of an object taken by a camera device is smoothed. After such optional image processing is carried out, the image shown in FIG. 7B is decomposed into an image including only odd scan lines and an image including only even scan lines to obtain an interlaced image signal. Therefore, in a moving picture thus consequently obtained, movement of the object may not be smooth, and rather, awkward movement may result.

FIGS. 8A, 8B, 8C and 8D illustrate an advantage obtained when the second method is used.

In this case, in the second method, in contrast to an image (shown in FIG. 8A) obtained from combining scan lines having different times at which images have been taken by a camera device, images each having a pseudo non-interlaced arrangement are obtained including a first image (shown in FIG. 8B) including only odd scan lines taken by a camera device at the same time and a second image (shown in FIG. 8C) including only even scan lines taken by the camera device at the same time. Then, corrections indicated by □ symbols are carried out on each of image signals corresponding to the above-mentioned first image and second image, in the above-mentioned filter process.

When the resulting image signal which is an interlaced image signal is used by a monitor, an image shown in FIG. 8D appears. In this case, actually, first an image of odd scan lines ODD(1), ODD(1), ODD(2), ODD(3), . . . is displayed on the monitor, and then, after a predetermined interval has elapsed, an image of even scan lines EVEN(1), EVEN(1), EVEN(2), EVEN(3), . . . is displayed on the monitor. As a result, a moving picture such that movement of an object appears smoothly can be obtained.

FIGS. 9A, 9B, 9C and 9D show block diagrams of image processing apparatuses in first through fourth embodiments, respectively, each having a configuration according to the above-described embodiments.

In each figure, to the same parts as those of the related arts described above with reference to FIGS. 2, 3, 4A and 5A, the same reference numerals are given, and duplicate description is omitted.

Figure 9B:
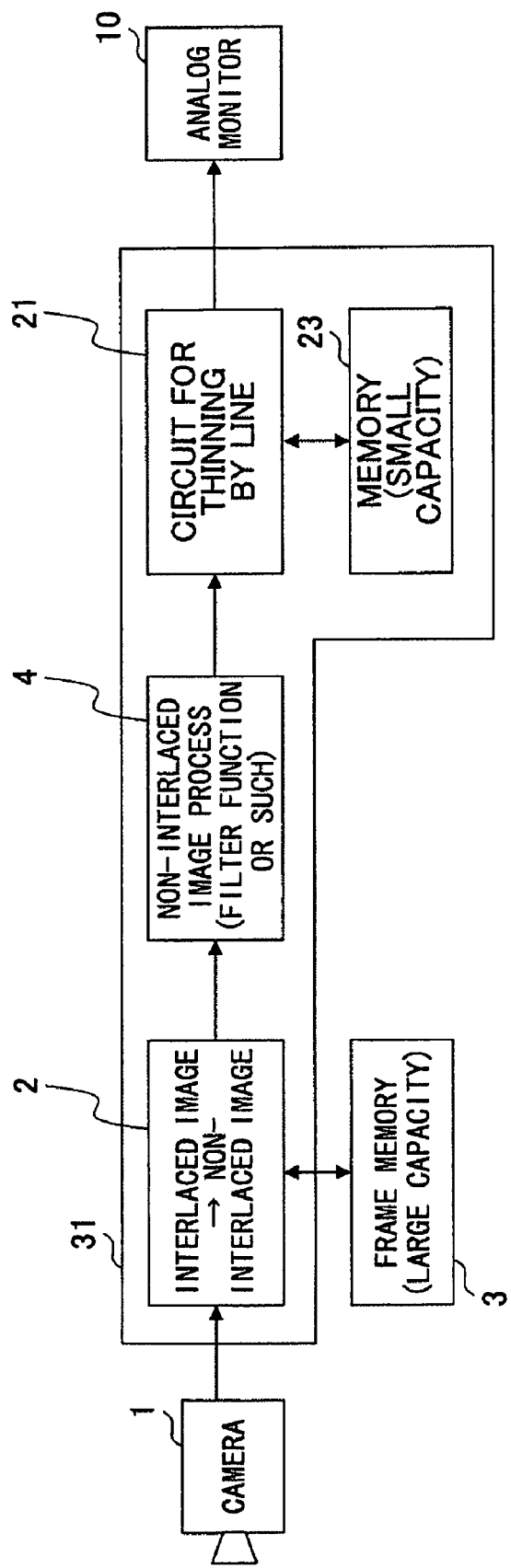
FIG. 9B shows a functional block diagram of a second embodiment.
Figure 9C:
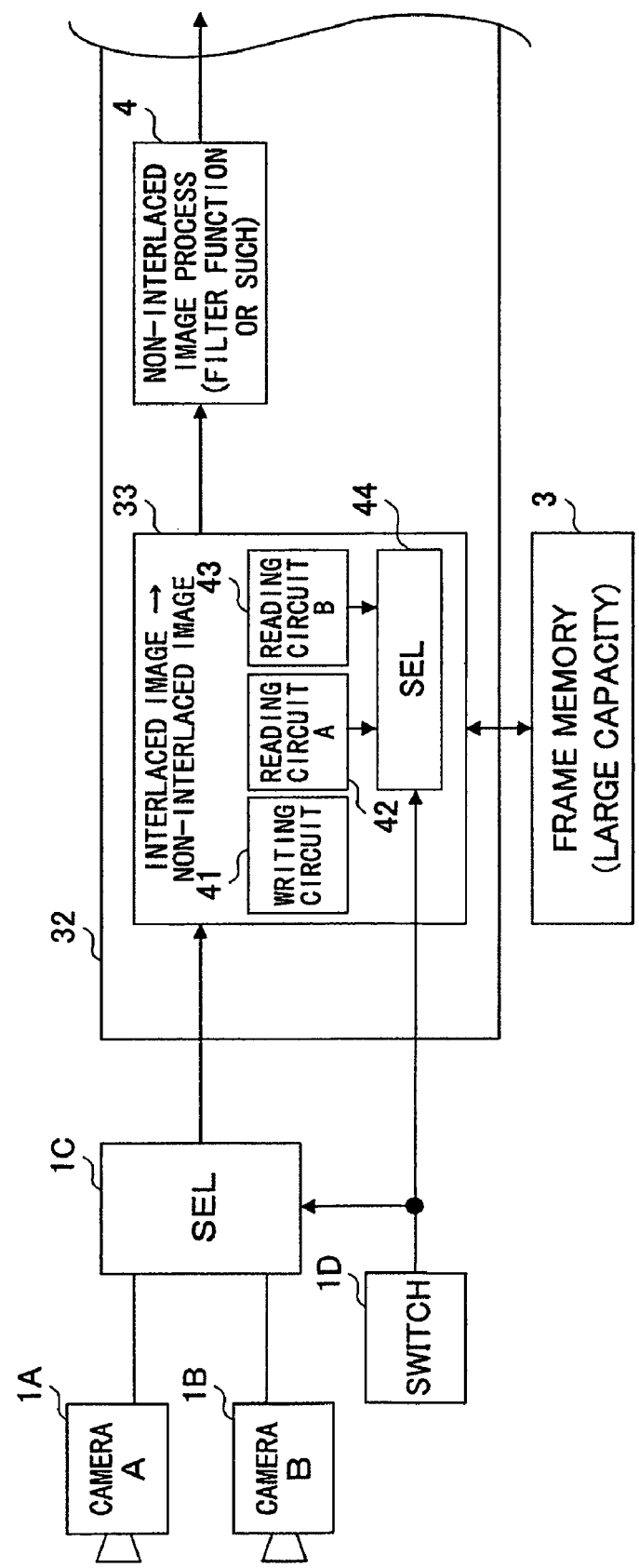
FIG. 9C shows a functional block diagram of a third embodiment.
Figure 9D:
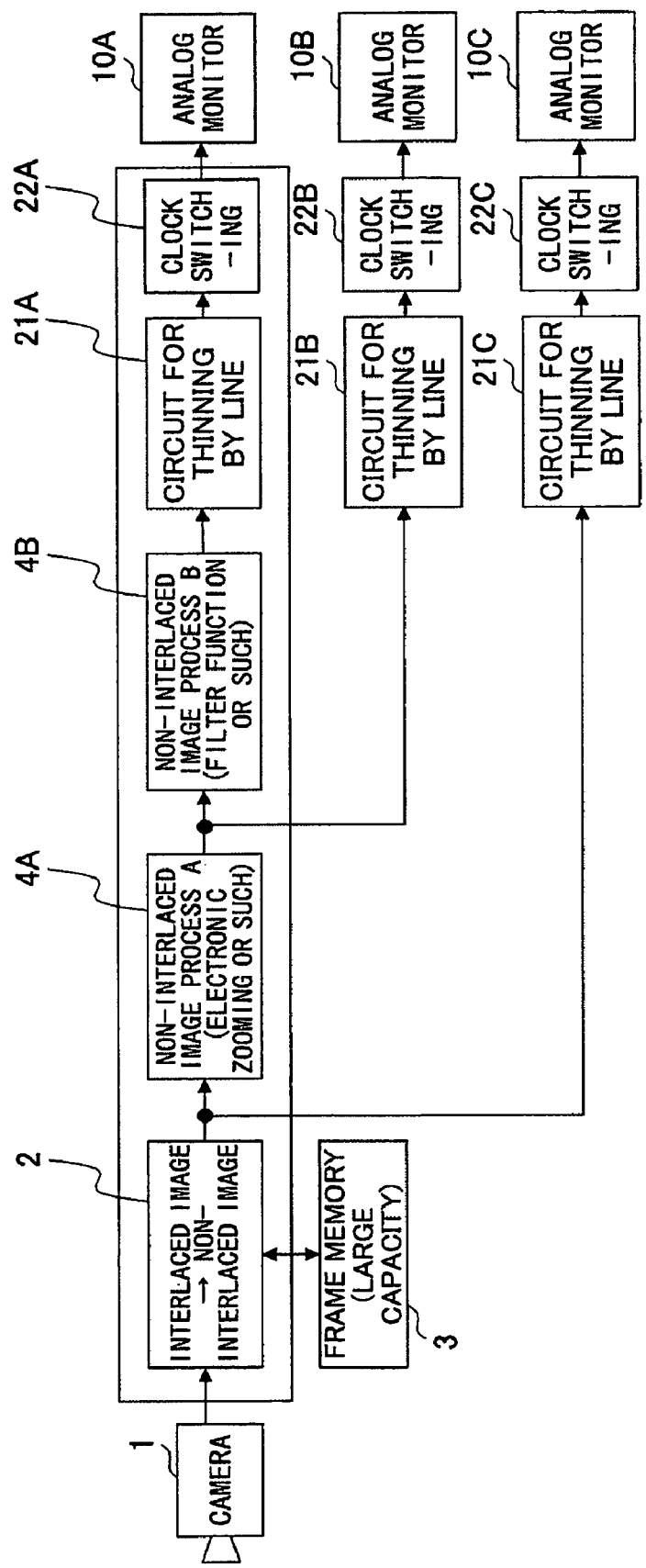
FIG. 9D shows a functional block diagram of a fourth embodiment.

To each of the first, second and fourth embodiments shown in FIGS. 9A, 9B and 9D, any one of the above-mentioned first and second methods can be applied.

In the first embodiment shows in FIG. 9A, an interlaced to non-interlaced circuit 2, an image processing part 4, a thinning circuit 21 and a clock switching circuit 22 are formed in a substrate 30 such as a FPGA, a ASIC, or such. The thinning circuit 21 extracts, from each of the above-mentioned two sets of double-rate image signals of non-interlaced arrangements or image signals of pseudo non-interlaced arrangements, odd scan lines and even scan lines in sequence.

The clock switching circuit 22 adjusts clock timing of an image signal thus extracted by the thinning circuit 21 to conform it to the requirements of a destination to which the image signal is provided. Specifically, a flip-flop circuit or such can be used as the clock switching circuit 22.

The second embodiment shown in FIG. 9B has the same configuration as that of the first embodiment described above. However, instead of the clock switching circuit 22, a memory 23 is provided. That is, for the same purpose of adjusting clock timing of an image signal extracted by a thinning circuit 21, the image signal is first written in the memory 23, and then, the image signal is read from the memory 23 in clock timing conforming to the requirements of the destination to which the image signal is provided. In the second embodiment shown in FIG. 9B, an interlaced to non-interlaced circuit 2, an image processing part 4, the thinning circuit 4 and the memory 23 are formed in a substrate 31 of a FPGA, a ASIC or such. As the above-mentioned memory 23, a RAM included in the substrate of the FPGA, ASIC or such may be used.

A configuration of the third embodiment shown in FIG. 9C is also the same as that of the first embodiment. However, in the third embodiment, as a camera device to take an image signal, a camera device 1A of the above-mentioned 60-Hz method and a camera device 1B of the above-mentioned 30-Hz method are provided. An operator operates a switch 1D to switch a selector 1C, to select any one of the two camera devices 1A and 1B.

In the third embodiment of FIG. 9C, instead of the interlaced to non-interlaced circuit 2 of FIG. 9A, an interlaced to non-interlaced circuit 33 is provided. The interlaced to non-interlaced circuit 33 includes, as shown, in addition to a writing circuit 41, two reading circuits 42 and 43, as well as a selector 44 for switching the two reading circuits 42 and 43 in response to the operator's operation of the above-mentioned switch 1D. That is, as mentioned above, when the camera device 1A of the 30-Hz method is selected by the switch 1D, the selector 44 automatically operates so that the reading circuit 42 configured to take a part of carrying out the first method is used. When the camera device 1B of the 60-Hz method is selected by the switch 1D, the selector 44 automatically operates so that the reading circuit 43 configured to take a part of carrying out the second method is selected.

Other than the above-mentioned points, the third embodiment has the same configuration as that of the first embodiment of FIG. 9A or the second embodiment of FIG. 9B.

In the third embodiment, the same as in the first and second embodiments, the signal processing circuit is formed in a substrate 32 such as a FPGA, an ASIC or such.

The fourth embodiment shown in FIG. 9D has the almost same configuration as that of the first embodiment of FIG. 9A. In the fourth embodiment, the same as the above-described circuit example shown in FIG. 3, the image processing part is divided into an image processing part 4A for carrying out optional image processing such as an electronic zooming process and an image processing part 4B for carrying out a filter function process or such. Before and after each of these processes, an image signal can be monitored by a respective one of analog monitors 10C, 10B and 10A.

For this purpose, in the fourth embodiment, for the respective image signals, thinning circuits 21C, 21B and 21A, and clock switching circuits 22C, 22B and 22A, are provided, respectively.

Below, operation of the above-mentioned first embodiment of FIG. 9A when the first method is applied will be described with reference to FIGS. 10A, 10B, 12A, 12B, 12C, 12D and 12E.

Figure 10A:
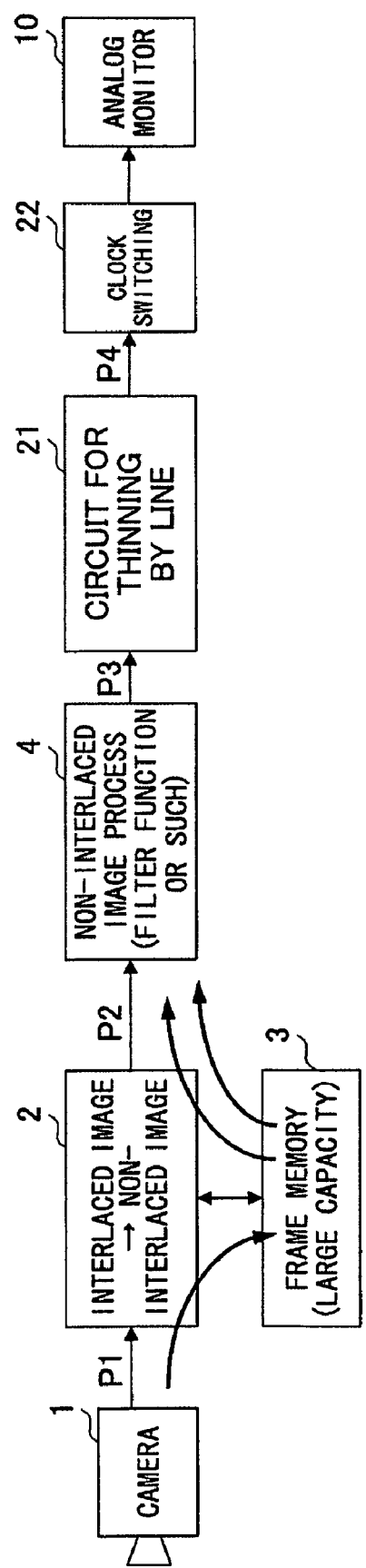

FIG. 10A shows a functional block diagram of the image processing apparatus in the first embodiment the same as that shown in FIG. 9A.

As shown in FIG. 10B, when an interlaced image signal ODD(C) and EVEN(C) is provided to a signal path P1 from the camera device 1, field by field, in sequence, first the interlaced to non-interlaced circuit 2 writes an odd scan line image signal ODD(C) (including scan lines ODD(1), ODD(2), . . . , ODD(240)) in the frame memory 3 in sequence. After the completion thereof, the interlaced to non-interlaced circuit 2 reads these scan lines ODD(1), ODD(2), . . . , ODD(240) from the frame memory 3 in sequence at a double rate, disposes the thus-read scan lines alternately with an even scan line image signal EVEN(C) (including scan lines EVEN(1), EVEN(2), . . . , EVEN(240)) subsequently provided from the signal path P1, in sequence.

Figure 12C:
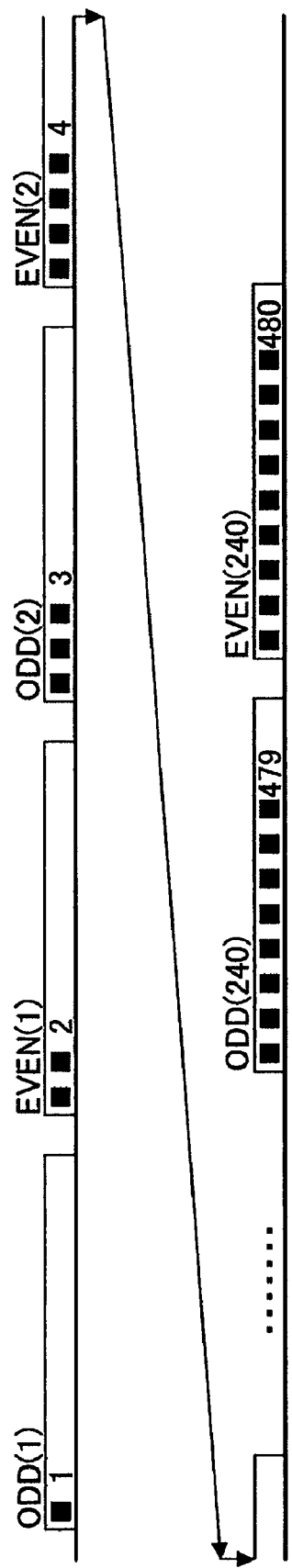

As a result, to the image processing circuit 4, in an interval of one field, a first set of an image signal (ODD(C)/EVEN(C) of a non-interlaced arrangement having a total of 480 scan lines, i.e., ODD(1), EVEN(1), ODD(2), EVEN(2), . . . , ODD(240) and EVEN(240)) is provided (see FIGS. 12B and 12C).

It is noted that, FIG. 12A shows a state of the image signal provided from the camera device 1. However, the interlaced image signal actually provided to the interlaced to non-interlaced circuit 2 via the signal path P1 is such that, as shown in FIG. 10B, for each frame, first only the odd scan lines of scan lines shown in FIG. 12A are provided in sequence, and subsequently, only the even scan lines of scan lines shown in FIG. 12A are provided in sequence.

In these figures, ODD(1), EVEN(1), . . . indicate image signals of the respective scan lines.

In parallel to the above-mentioned operation, the interlaced to non-interlaced circuit 2 writes the thus-provided even scan line image signal EVEN(C) to the frame memory 3 in sequence. As a result, when the above-mentioned first set of double-rate image signal having the non-interlaced arrangement has been provided to a signal path P2, a state occurs in which an image signal having the same contents has been written in the frame memory 3.

Figure 12D:
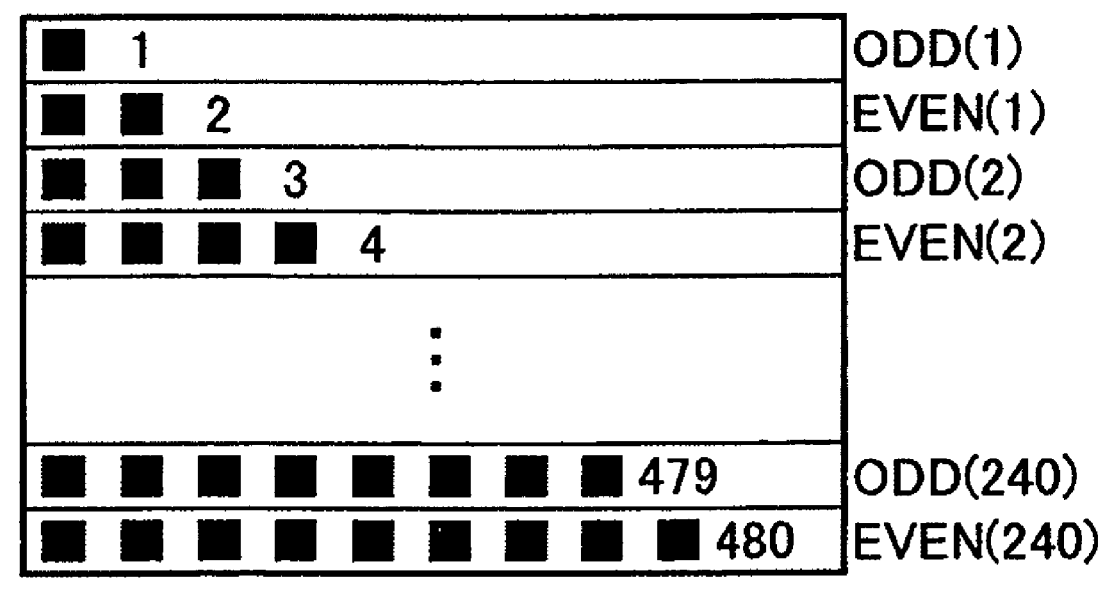
Figure 12E:
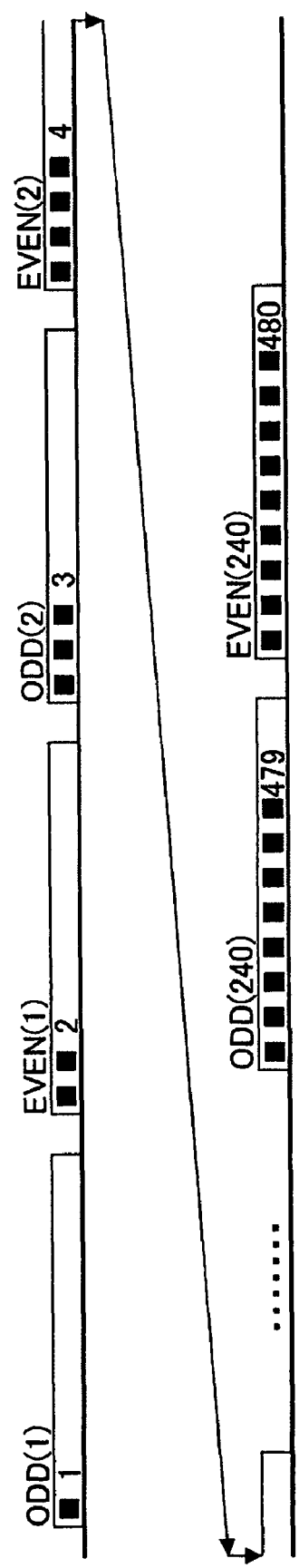

Next, the interlaced to non-interlaced circuit 2 reads the above-mentioned image signal having the same contents as those of the first set of the image signal having the non-interlaced arrangement thus written in the frame memory 3, so that the thus-read image signal has the same configuration, and provides the thus-obtained image signal to the signal path P2. As a result, subsequent to the above-mentioned first set of the image signal of the non-interlaced arrangement shown in FIGS. 12B and 12C, a second set of an image signal of a non-interlaced arrangement having the same contents as those of the first set, shown in FIGS. 12D and 12E, is provided to the signal path P2. These respective sets of image signals each having the non-interlaced arrangement (each including 480 scan lines) are provided in double-rate clock timing as mentioned above. As a result, within an interval of one frame, delayed by a ½ frame interval, the two sets of image signals of non-interlaced arrangements having the same contents (i.e., ODD(C)/EVEN(C), and then, ODD(C)/EVEN(C)) are provided in sequence.

The thus-provided two sets of image signals of the non-interlaced arrangements undergo optional image processing in the image processing part 4, and then, are provided to a signal path P3 almost without delay. The thinning circuit 21 receives these image signals, then, as mentioned above, extracts only odd scan lines from the first set of image signal of non-interlaced arrangement and then, extracts only even scan lines from the second set of image signal of non-interlaced arrangement.

That is, from the image signal of non-interlaced arrangement ODD(1), EVEN(1), ODD(2), EVEN(2), . . . , only odd scan line image signal ODD(1), ODD(2), . . . are taken for the first set, and, in the same way, only even scan line image signal EVEN(1), EVEN(2), . . . are taken for the second set.

As a result, it is possible to obtain an interlaced image signal ODD(C') and EVEN(C') at the original transmission rate, i.e., having a total of 480 scan lines ODD(1), ODD(2), . . . , ODD(240), and then, EVEN(1), EVEN(2), . . . , EVEN(240), in each frame, on a signal path P4.

Next, operation for when the second method is applied will be described with reference to FIGS. 11A, 11B, 13A, 13B, 13C, 13D and 13E.

Figure 11A:
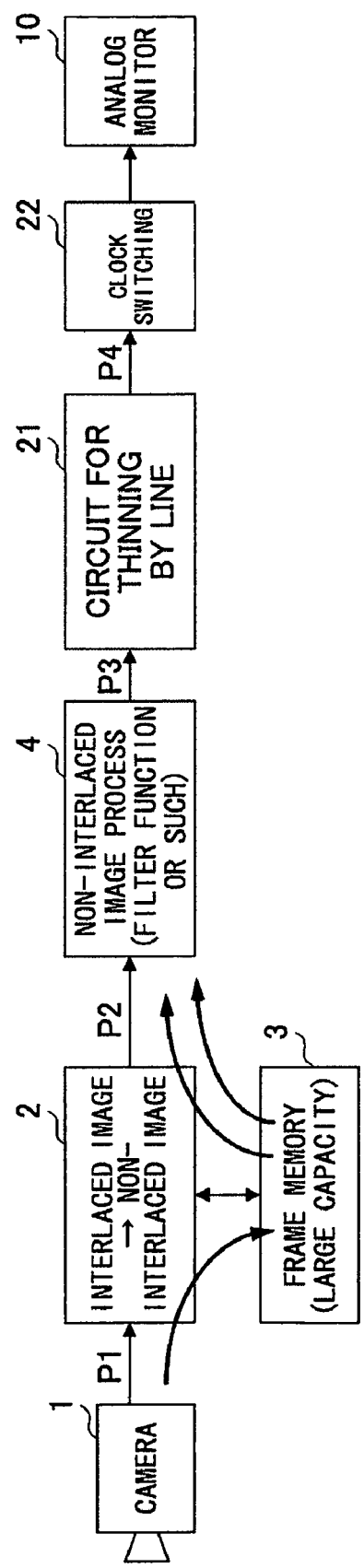

FIG. 11A shows a functional block diagram of the image processing apparatus in the first embodiment the same as that shown in FIG. 9A.

As shown in FIG. 11B, when an interlaced image signal ODD(C) and EVEN(C) is provided to a signal path P1 from the camera device 1 in sequence by each field, the interlaced to non-interlaced circuit 2 first writes in the frame memory 3 an odd scan line image signal ODD(C), including ODD(1), ODD(2), . . . , ODD(240), in sequence. Further, the interlaced to non-interlaced circuit 2 reads, from the frame memory 3, the odd scan line image signal, i.e., ODD(1), ODD(2), . . . , scan line by scan line, each scan line being read twice, in sequence, which has been thus written in the frame memory 3, scan line by scan line.

Specifically, as shown in FIG. 11B, at a stage at which approximately a first half of the scan line ODD(1) has been written in the frame memory 3, reading thereof is started. There, with respect to a rate of the writing, the reading is carried out in approximately double-rate clock timing. By thus delaying the reading start timing by approximately a half of a scan line as mentioned above, it is possible to avoid a situation that, during the reading, a signal to be read has not been written in the frame memory 3 yet.

Figure 13C:
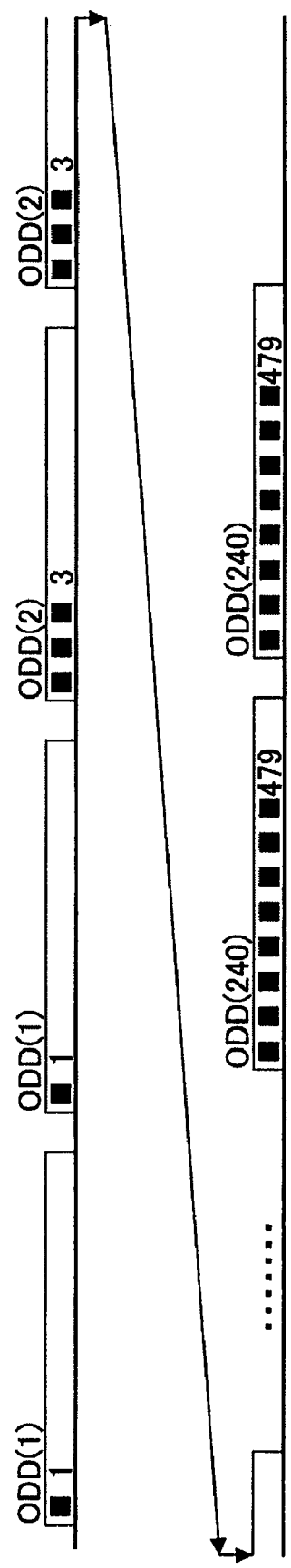

After the writing operation and the reading operation of the same signal are finished for the scan line, the same signal of the scan line is again read in the same double-rate clock timing. By repeating the operation, scan line by scan line, odd scan lines for the frame are provided to a signal path P2, in sequence, with the delay of an approximately ½ scan line from the timing at which the image signal has been provided by the camera device 1, in such a manner that each scan line is provided duplicately, scan line by scan line. FIGS. 13B and 13C show this state.

Figure 13D:
Figure 13E:
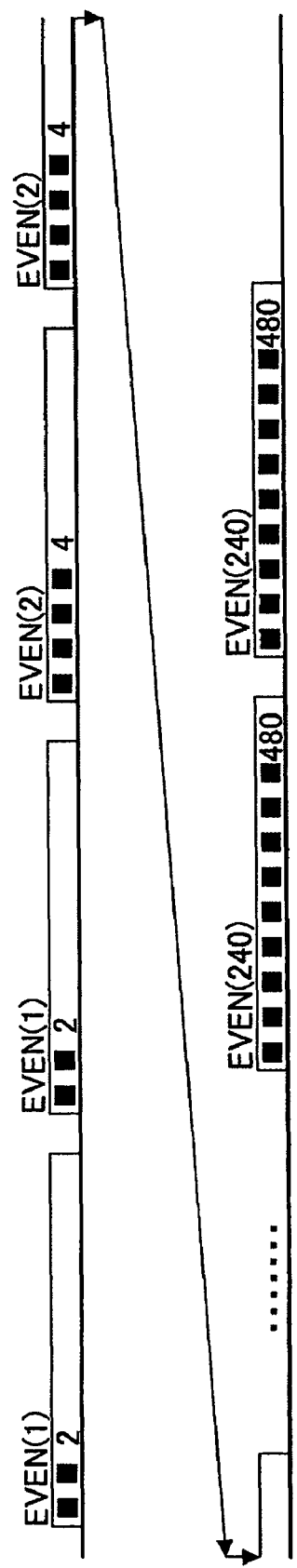

After that, in the same manner, the interlaced to non-interlaced circuit 2 writes, in the frame memory 3, even scan lines EVEN(1), EVEN(2), . . . , EVEN(240) subsequently provided to the signal path P1, in sequence, and also, reads the same signal with a delay of an approximately ½ scan line. And, after the writing operation and the reading operation of the same signal are finished for the scan line, the same signal of the scan line is again read in the same double-rate clock timing. By repeating the operation, scan line by scan line, the even scan lines for the frame are provided to the signal path P2, in sequence, with the delay of an approximately ½ scan line from the timing at which the image signal has been provided by the camera device 1, in such a manner that each scan line is provided duplicately, scan line by scan line. FIGS. 13D and 13E show this state.

FIG. 13A shows the contents of the above-mentioned image signal provided by the camera device 1. However, actually, the interlaced image signal provided to the interlaced to non-interlaced circuit 2 via the signal path P1 is such that, as shown in FIG. 11B, by each frame, only the odd scan lines of the scan lines shown in FIG. 13A are first provided in sequence, and subsequently, only the even scan lines are provided in sequence.

In each of the double-rate odd scan line image signal ODD (1), ODD(1), ODD(2), ODD(2), . . . , ODD(240) and ODD (240) (i.e., a first set) and the double-rate even scan line image signal EVEN(1), EVEN(1), EVEN(2), EVEN(2), . . . , EVEN (240), EVEN(240) (i.e., a second set), the same image signal is duplicately provided as shown, scan line by scan line, as shown in FIG. 11B, path P2, and FIGS. 13B, 13C or FIGS. 13D, 13E. Each of these image signals has, as shown in FIGS. 13B, 13D, an information amount corresponding to 480 scan lines each. These image signals are referred to as 'image signals having pseudo non-interlaced arrangements', mentioned above. The above-mentioned information amount corresponds to, an information amount of each double-rate image signal having a non-interlaced arrangement, i.e., ODD (1), EVEN(1), ODD(2), EVEN(2), . . . , ODD(240), EVEN (240) (as shown in FIG. 10B, signal path P2, FIGS. 12B, 12D) in the first method.

The thus-provided two sets of double-rate image signals of the pseudo non-interlaced arrangements undergo optional image processing in the image processing part 4, the same as in the first method mentioned above. After that, the image signals are provided to a signal path P3 approximately without delay. The thinning circuit 21 which receives these signals, as mentioned above, extracts only ordinary (i.e., without duplication) odd scan lines from the first set (i.e., the image signal including the odd scan lines duplicately), and extracts only ordinary (i.e., without duplication) even scan lines from the second set (i.e., the image signal including the even scan lines duplicately).

In other words, from the first set of image signal having the pseudo non-interlaced arrangement, i.e., ODD(1), ODD(1), ODD(2), ODD(2), . . . , only the ordinary odd scan line image signal, i.e., ODD(1), ODD(2), . . . , is taken. In the same way, from the second set of image signal having the pseudo non-interlaced arrangement, i.e., EVEN(1), EVEN(1), EVEN(2), EVEN(2), . . . , only the ordinary even scan line image signal, i.e., EVEN(1), EVEN(2), . . . , is taken. The thus-taken image signals are then provided to a signal path P4.

As a result, it is possible to obtain, on the signal path P4, an interlaced image signal ODD(C') and EVEN(C') at the original transmission rate, that is, having 480 scan lines (i.e., ODD(1), ODD(2), . . . , ODD(240), EVEN(1), EVEN(2), . . . , EVEN(240)) for each frame.

Although the invention has been described with respect to the specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
 a double rate processing part configured to generate, at a double rate, a non-interlaced image signal every frame to twice generate a double-rate non-interlaced signal which has identical information duplicately; and
 an interlace processing part configured to, after a predetermined process is carried out on the double-rate non-interlaced signal twice generated by the double rate processing part, extract odd scan lines from one of the twice generated double-rate non-interlaced signal to generate an odd scan line image signal, extract even scan lines from the other of the twice generated double-rate non-interlaced signal to generate an even scan line image signal, so as to obtain an interlaced image signal for the frame.

2. The image processing apparatus as claimed in claim 1, wherein:
 said interlace processing part comprises an image storing part configured to store the odd scan line image signal or the even scan line image signal, and
 the non-interlaced image signal is generated at a double rate as a result of the odd scan line image signal or the even scan line image signal being read from the storing part, scan line by scan line in sequence, and being disposed alternately with an odd scan line image signal or an even scan line image signal, scan line by scan line, which has been subsequently transmitted, scan line by scan line in sequence.

3. An image processing apparatus comprising:
 a double rate processing part configured to generate a double-rate and double odd scan line image signal, having identical information duplicately, scan line by scan line, from an odd scan line image signal of an interlaced image signal, and generate a double-rate and double even scan line image signal, having identical information duplicately, scan line by scan line, from an even scan line image signal of the interlaced image signal; and
 an interlace processing part configured to extract, after a predetermined process is carried out, odd scan lines for one field from the double-rate and double odd scan line image signal, extract even scan lines for one field from the double-rate and double even scan line image signal, to obtain an interlaced image signal for one frame.

4. The image processing apparatus as claimed in claim 3, wherein:
 said double rate processing part comprises a storing part configured to store, a scan line by scan line, the odd scan line image signal or the even scan line image signal which has been transmitted, and
 a scan line of the odd scan line image signal or the even scan line image signal which has been transmitted in sequence is written in the storing part and then is read therefrom, thereby the same scan line is obtained twice, and the double-rate and double odd scan line image signal or the double-rate and double even scan line image signal is obtained.

5. The image processing apparatus as claimed in claim 3, wherein:
 the interlaced image signal to be processed by the double rate processing part is a signal obtained from interlace of an odd scan line image and an even scan line signal, extracted alternately from each frame of information of a double-rate non-interlaced image signal which includes one frame of information at every period of ½ of a frame period.

6. An image processing method comprising:

a double rate processing step of generating, at a double rate, a non-interlaced image signal every frame to twice generate a double-rate non-interlaced signal which has identical information duplicately; and an interlace processing step of, after a predetermined process is carried out on the double-rate non-interlaced signal twice generated in the double rate processing step, extracting odd scan lines from one of the twice generated double-rate non-interlaced signal to generate an odd scan line image signal, extracting even scan lines from the other of the twice generated double-rate non-interlaced signal to generate an even scan line image signal, so as to obtain an interlaced image signal for the frame.

7. The image processing method as claimed in claim 6, wherein:

said interlace processing step comprises an image storing step of storing in a storing part the odd scan line image signal or the even scan line image signal, and the non-interlaced image signal is generated at a double rate as a result of the odd scan line image signal or the even scan line image signal being read from the storing part, scan line by scan line in sequence, and being disposed alternately with an odd scan line image signal or an even scan line image signal, scan line by scan line, which has been subsequently transmitted, scan line by scan line in sequence.

* * * * *